(12) United States Patent
Van Straten

(10) Patent No.: US 8,854,794 B2
(45) Date of Patent: Oct. 7, 2014

(54) MOBILE ELECTRICITY GENERATOR USING SOLAR PANELS

(71) Applicant: George Van Straten, Baraga, MI (US)

(72) Inventor: George Van Straten, Baraga, MI (US)

( * ) Notice: Subject to any disclaimer, the term of this patent is extended or adjusted under 35 U.S.C. 154(b) by 0 days.

(21) Appl. No.: 14/155,526

(22) Filed: Jan. 15, 2014

(65) Prior Publication Data

US 2014/0125134 A1    May 8, 2014

Related U.S. Application Data

(63) Continuation-in-part of application No. 13/612,093, filed on Sep. 12, 2012, now Pat. No. 8,654,512, which is a continuation of application No. 13/011,291, filed on Jan. 21, 2011, now Pat. No. 8,295,033.

(60) Provisional application No. 61/297,078, filed on Jan. 21, 2010, provisional application No. 61/359,899, filed on Jun. 30, 2010.

(51) Int. Cl.
*H02B 1/00* (2006.01)
*H01L 31/04* (2014.01)
*H02J 7/02* (2006.01)
*H02J 7/35* (2006.01)
*F03D 9/00* (2006.01)
*F03D 11/04* (2006.01)
*F03D 1/00* (2006.01)
*H02S 30/20* (2014.01)
*H02S 10/10* (2014.01)
*H02P 9/04* (2006.01)

(52) U.S. Cl.
CPC ............... *H02S 10/00* (2013.01); *H02J 7/025* (2013.01); *H02J 7/35* (2013.01); *H02P 9/04* (2013.01); *Y02E 10/50* (2013.01); *Y02E 10/725* (2013.01); *Y02E 10/726* (2013.01); *Y02E 10/728* (2013.01); *F03D 9/007* (2013.01); *F03D 11/04* (2013.01); *F03D 1/005* (2013.01); *H01L 31/045* (2013.01); *H01L 31/0583* (2013.01); *F05B 2220/708* (2013.01); *F05B 2240/142* (2013.01); *F05B 2240/2211* (2013.01); *F05B 2240/9151* (2013.01); *F05B 2240/9152* (2013.01)
USPC ................................ 361/601; 290/44; 290/55

(58) Field of Classification Search
CPC .......................................................... H02P 9/04
See application file for complete search history.

(56) References Cited

U.S. PATENT DOCUMENTS 6,396,239 B1    5/2002  Benn et al.
7,230,819 B2    6/2007  Muchow et al.

(Continued)

OTHER PUBLICATIONS

Hubner EnergyContainer Mobile Energy for the World, 8 pages, Copyright Sep. 2010, http://www.huebner-giessen.com/fileadmin/dokumente/Energie_Systeme/EnergyContainer/2011-03-14_EnergyContainer_en.pdf.

(Continued)

*Primary Examiner* — Gregory Thompson
(74) *Attorney, Agent, or Firm* — Price Heneveld LLP

(57) ABSTRACT

A mobile electricity generator comprising a telescopic boom, a first retractable support leg, and a base. The telescopic boom comprises a first end and a second end. A wind turbine is attached to the second end of the telescopic boom and the wind turbine is capable of transforming wind into electricity. The first end of the telescopic boom and the first retractable support leg are attached to the base. The electricity generator has a movable solar panel assembly that may be stored in the base and deployed to a use position and a pair of doors each equipped with a solar panel swing having solar panels. The mobile electricity generator can further comprise a battery in electric communication with the solar panels for storing the electricity.

20 Claims, 19 Drawing Sheets

(56) References Cited

U.S. PATENT DOCUMENTS

| | | | |
|---|---|---|---|
| 7,749,380 | B2 | 7/2010 | Yungner et al. |
| 8,043,499 | B2 | 10/2011 | Saeed et al. |
| 8,299,645 | B2 * | 10/2012 | Muchow et al. ............... 290/55 |
| 8,539,724 | B2 * | 9/2013 | Bullivant et al. ............ 52/173.3 |
| 8,664,511 | B2 * | 3/2014 | Swatek et al. ................ 136/244 |
| 8,720,125 | B2 * | 5/2014 | Andretich .................... 52/79.5 |
| 2005/0218651 | A1 | 10/2005 | Lamm |
| 2006/0137348 | A1 * | 6/2006 | Pas ............................... 60/641.1 |
| 2006/0137488 | A1 | 6/2006 | Sakaue et al. |
| 2008/0068782 | A1 | 3/2008 | Muchow et al. |
| 2009/0079161 | A1 | 3/2009 | Muchow et al. |
| 2010/0078942 | A1 | 4/2010 | Bois |
| 2010/0117368 | A1 | 5/2010 | Benito et al. |
| 2010/0140950 | A1 | 6/2010 | Pitre |

OTHER PUBLICATIONS

REMUS (Renewable Energy Mobile Utility System), 4 pages, no date provided, http://www.titansentry.com/PDF/2008%2011%2012_REMUS%20brochure.pdf.

Natural Power Concepts: Hawaii-based Natural Power Concepts, Inc. Selected by Oshkosh Corporation to Collaborate on "Renewable Energy Mission Module," 2 pages, no date provided, http://www.naturalpowerconcepts.com/slide01.html; http://www.naturalpowerconcepts.com/news_osk.html.

Alpha Energy Features Pre-Configured Solar and Wind Hybrid Power Supplies and Configurator Press Release, Alpha Technologies, 1 page, Oct. 27, 2009, http://www.alpha.com/Media/Documents/HPSConfigurator.pdf.

* cited by examiner

MOBILE ELECTRICITY GENERATOR USING SOLAR PANELS

CROSS-REFERENCE TO RELATED APPLICATIONS

This application is a continuation-in-part of U.S. patent Ser. No. 13/612,093, filed Sep. 12, 2012, entitled "MOBILE ELECTRICITY GENERATOR USING SOLAR, WIND, AND FUEL-GENERATED POWER," which is a continuation of U.S. patent Ser. No. 13/011,291, filed Jan. 21, 2011, entitled "MOBILE ELECTRICITY GENERATOR USING SOLAR, WIND, AND FUEL-GENERATED POWER," now U.S. Pat. No. 8,295,033, which claims the priority benefit of U.S. Provisional Application No. 61/297,078, filed on Jan. 21, 2010, and U.S. Provisional Application No. 61/359,899, filed on Jun. 30, 2010. The aforementioned related applications are hereby incorporated by reference.

BACKGROUND OF THE INVENTION

The present invention generally relates to a mobile electricity generator using solar, wind, and/or fuel-generated power.

SUMMARY OF THE INVENTION

Described herein are several embodiments of a mobile electricity generator that uses sunlight and may further use wind and/or fuel as means to generate electricity. A method of using the mobile electricity generator to generate electricity to power a device that requires electricity is additionally described herein.

More specifically, according to one aspect of the present invention, an electricity generator is provided. The electricity generator includes a base comprising side walls defining an interior volume. At least one of the side walls comprises one or more doors for allowing access to the interior volume. The electricity generator also includes a movable solar panel swing assembly comprising a support structure connected to a first solar panel swing and disposed on a track for allowing movement of the assembly between a stowed position within the interior volume and a use position outside the interior volume. The solar panel swing comprises one or more solar panels that rotate between a folded position and a use position.

According to another aspect of the present invention, an electricity generator is provided that includes a base comprising side walls defining an interior volume. At least one of the side walls comprises first and second doors for allowing access to the interior volume. The electricity generator also includes a movable solar panel swing assembly comprising a support structure connected to a first solar panel swing and disposed on a track for allowing movement of the assembly between a stowed position within the interior volume and a use position outside the interior volume, a second solar panel swing connected to the first door and comprising one or more solar panels that rotate between a folded position and a use position when the first door is in the open position, and a third solar panel swing connected to the second door and comprising one or more solar panels that rotate between a folded position and a use position when the second door is in the open position.

According to another embodiment, is a mobile electricity generator comprising a telescopic boom, a wind turbine, a first retractable support leg, and a base. The telescopic boom can comprise a first end and a second end. The wind turbine can be attached to the second end of the telescopic boom and the wind turbine is capable of transforming wind into electricity. The first end of the telescopic boom can be attached to the base. The first retractable support leg can be attached to the base.

The first retractable support leg can be capable of both a retracted position and an extended position. The base can comprise a first housing that can at least partially house the first retractable support leg when the first retractable support leg is in the retracted position.

The mobile electricity generator can further comprise a second retractable support leg and a third retractable support leg. The second retractable support leg and the third retractable support leg can both be capable of both a retracted position and an extended position. The base can further comprise a second housing that at least partially houses the second retractable support leg when the second retractable support leg is in the retracted position and a third housing that at least partially houses the third retractable support leg when the third retractable support leg is in the retracted position.

The base can further comprise a bottom surface. The bottom surface can at least partially touch a ground surface when the first retractable support leg, the second retractable support leg, and the third retractable support leg are in their respective retracted positions. In contrast, the bottom surface may not touch the ground surface when the first retractable support leg, the second retractable support leg, and the third retractable support leg are in their respective extended positions.

The mobile electricity generator can further comprise an extension hydraulic cylinder and an active hydraulic cylinder. The extension hydraulic cylinder can comprise a cylinder base and a piston end. The active hydraulic cylinder can comprise a cylinder base and a piston end. The piston end of the extension hydraulic cylinder can be hinged to the second end of the telescopic boom. The cylinder base of the extension hydraulic cylinder can be attached to the first end of the telescopic boom. The extension hydraulic cylinder can be capable of causing the second end of the telescopic boom to telescopically move away from the first end of the telescopic boom. The piston end of the active hydraulic cylinder can be hinged to the first end of the telescopic boom. The cylinder base of the active hydraulic cylinder and the first end of the telescopic boom can be hinged to the base. The telescopic boom can be capable of a resting position and an active position. The active hydraulic cylinder can be capable of causing the telescopic boom to move between the resting position and the active position.

The mobile electricity generator can further comprise a boom support. The boom support can comprise a lateral support, a first end, and a second end. The base can further comprise an external surface. The lateral support of the boom support can be attached to the external surface of the base. The cylinder base of the active hydraulic cylinder can be hinged to the first end of the boom support. The first end of the telescopic boom can be hinged to the second end of the boom support.

The base can further comprise a turbine cave, a boom cave, and a top surface. The first end of the telescopic boom can be hinged to the base within the boom cave. The cylinder base of the active hydraulic cylinder can be hinged to the base within the boom cave. When the telescopic boom is in the resting position, the boom cave can at least partially surround the telescopic boom and the turbine cave can at least partially surround the wind turbine, such that the top surface of the base is more highly elevated relative to the ground surface than the telescopic boom and the wind turbine.

The mobile electricity generator can further comprise a battery in electric communication with the wind turbine. The battery can be capable of at least temporarily storing the electricity generated by the wind turbine.

The mobile electricity generator can further comprise a first solar panel. The first solar panel can be capable of transforming light into electricity. The first solar panel can be attached to the base such that the external surface of the base does not impede the first solar panel's access to sunlight. The first solar panel can be in electric communication with the battery, which can be capable of at least temporarily storing the electricity generated by the first solar panel.

The mobile electricity generator can further comprise a solar panel swing. The solar panel swing can comprise a first end, a first side bracket, and a second side bracket. The first solar panel can comprise a first side and a second side. The first side of the first solar panel can be pivotally attached to the first side bracket and the second side of the first solar panel can be pivotally attached to the second side bracket. The first end of the solar panel swing can be hinged to the external surface of the base.

The mobile electricity generator can further comprise a first solar panel array and a second solar panel array. The first solar panel array can be capable of transforming light into electricity. The second solar panel array can be capable of transforming light into electricity. The first solar panel array and the second solar panel array can be attached to the external surface of the base. The first solar panel array and the second solar panel array can be in electric communication with the battery.

The mobile electricity generator can further comprise a first array support and a second array support. The first array support and the second array support can each comprise a first portion and a second portion. The second portion can be attached to the first portion at an array axis. The second portion can rotate relative to the first portion about the array axis. At least part of the first solar panel array can be attached to the first portion of the first array support and at least part of the first solar panel array can be attached to the second portion of the first array support. At least part of the second solar panel array can be attached to the first portion of the second array support and at least part of the second solar panel array can be attached to the second portion of the second array support. A boom alley can separate the first solar panel array and the second solar panel array. The telescopic boom can be capable of being at least partially within boom alley when the telescopic boom is in the resting position.

The mobile electricity generator can further comprise a fuel-based generator. The fuel-based generator can be capable of transforming fuel into electricity. The fuel-based generator can be in electric communication with the battery. The base can further comprise an inner chamber. The inner chamber can at least partially house the fuel-based generator and the battery.

The mobile electricity generator can further comprise a light source attached to the telescopic boom.

In another embodiment, the mobile electricity generator can comprise a telescopic boom, a wind turbine, a first retractable support leg, and a base. The base can comprise a trailer. The trailer can comprise at least two wheels, a hitch, a first housing, a second housing, and a third housing. The mobile electricity generator can further comprise a second retractable support leg attached to the trailer, a third retractable support leg attached to the trailer, and a fourth retractable support leg attached to the trailer. The first end of the telescopic boom can be hinged to the trailer. The first retractable support leg, the second retractable support leg, and the third retractable support leg can all comprise a first part and a second part. The first part can comprise a support foot, and the first part can be capable of telescoping into the second part. The second part of the first retractable leg can be capable of telescoping into the first housing. The second part of the second retractable leg can be capable of telescoping into the second housing. The second part of the third retractable leg can be capable of telescoping into the third housing.

The mobile electricity generator can further comprise a first solar panel and a first battery, both supported by the trailer. The first solar panel can be capable of transforming light into electricity. The first battery can be in electric communication with the wind turbine and the first solar panel. The first battery is capable of at least temporarily storing the electricity that the first solar panel and/or the wind turbine generates.

The mobile electricity generator can further comprise a first battery housing. The trailer can support the first battery housing. The first battery housing can at least partially house the first battery.

The mobile electricity generator can further comprise a second battery and a second battery housing. The trailer can support the second battery housing. The second battery housing can at least partially house the second battery. A boom alley can separate the first battery housing and the second battery housing. The telescopic boom is capable of a resting position and an active position. The telescopic boom is capable of being at least partially within boom alley when the telescopic boom is in the resting position.

The trailer can further comprise a platform. At the active position, the telescopic boom can be approximately perpendicular to the platform and the turbine can be able to rotate.

The mobile electricity generator can further comprise a second solar panel. The first solar panel can be mounted upon the first battery housing. The second solar panel can be mounted upon the second battery housing. It is possible that neither the telescopic boom nor the wind turbine cover either of the first solar panel or the second solar panel, when the telescopic boom is in the resting position.

The mobile electricity generator can further comprise a fuel-based generator supported by the trailer. The fuel-based generator can be capable of transforming fuel into electricity. A light source can be attached to the telescopic boom.

In any embodiment, the wind turbine can comprise a series of rings with sets of fins separating the rings. The series of rings can comprise a first ring, a second ring, a third ring, a fourth ring, a fifth ring, a sixth ring, and a seventh ring. The sets of fins can comprise a first set of fins separating the first ring from the second ring, a second set of fins separating the second ring from the third ring, a third set of fins separating the third ring from the fourth ring, a fourth set of fins separating the fourth ring from the fifth ring, a fifth set of fins separating the fifth ring from the sixth ring, and a sixth set of fins separating the sixth ring from the seventh ring.

Each of the rings can comprise a width. The width of the first ring can be larger than the width of the fourth ring and width of the fourth ring can be larger than the width of the seventh ring. The width of the first ring, the second ring, and the third ring can be the same but larger than the width of the fourth ring and the fifth ring, which in turn can be larger than the width of the sixth ring and the seventh ring. Each of the rings can comprise an inner diameter and an outer diameter, wherein the inner diameter of the second ring can be larger than the outer diameter of the first ring, the inner diameter of the third ring can be larger than the outer diameter of the second ring, the inner diameter of the fourth ring can be larger than the outer diameter of the third ring, the inner diameter of the fifth ring can be larger than the outer diameter of the fourth ring, the inner diameter of the sixth ring can be larger than the outer diameter of the fifth ring, the inner diameter of the seventh ring can be larger than the outer diameter of the sixth ring.

Each ring can comprise a wind facing edge and a wind trailing edge. The wind facing edge can comprise a radial surface. Each fin can comprise a convex surface. Each fin of each set of fins can be approximately equally spaced apart. The wind facing edge of each ring can define a plane. The plane defined by the wind facing edge of each ring can be the same. Each fin can comprise a leading edge. The leading edge can define an axis. The axis of each fin can be on approximately the same plane defined by the wind facing edge of each ring. The wind trailing edge of the first ring can define a trailing plane. The wind trailing edges of the second ring and the third ring can define the same plane as the trailing plane of the first ring.

The convex surface of each of the fins of the first set of fins and the second set of fins can approximately touch the plane defined by the trailing plane of the first ring, the second ring, and the third ring. The wind trailing edges of the fourth ring and the fifth ring can lie in the same plane relative to each other but in a different plane relative to the plane defined by the wind trailing edges of the first ring, the second ring, and the third ring. The convex surface of each fin of the third set and fourth set of fins can approximately touch the plane defined by the wind trailing edges of the fourth ring and the fifth ring.

The wind trailing edges of the sixth ring and seventh ring can lie in the same plane relative to each other but in a different plane relative to the plane defined by the wind trailing edges of the fourth ring and the fifth ring. The convex surface of each fin of the fifth set and sixth set of fins can approximately touch the plane defined by the wind trailing edges of the sixth ring and the seventh ring.

The wind turbine can further comprise an axis of turbine rotation, wherein every ring can be concentric around the axis of turbine rotation. The axis of each fin can be directed towards and approximately intersect the axis of turbine rotation.

DETAILED DESCRIPTION OF THE PREFERRED EMBODIMENTS

Figure 1:
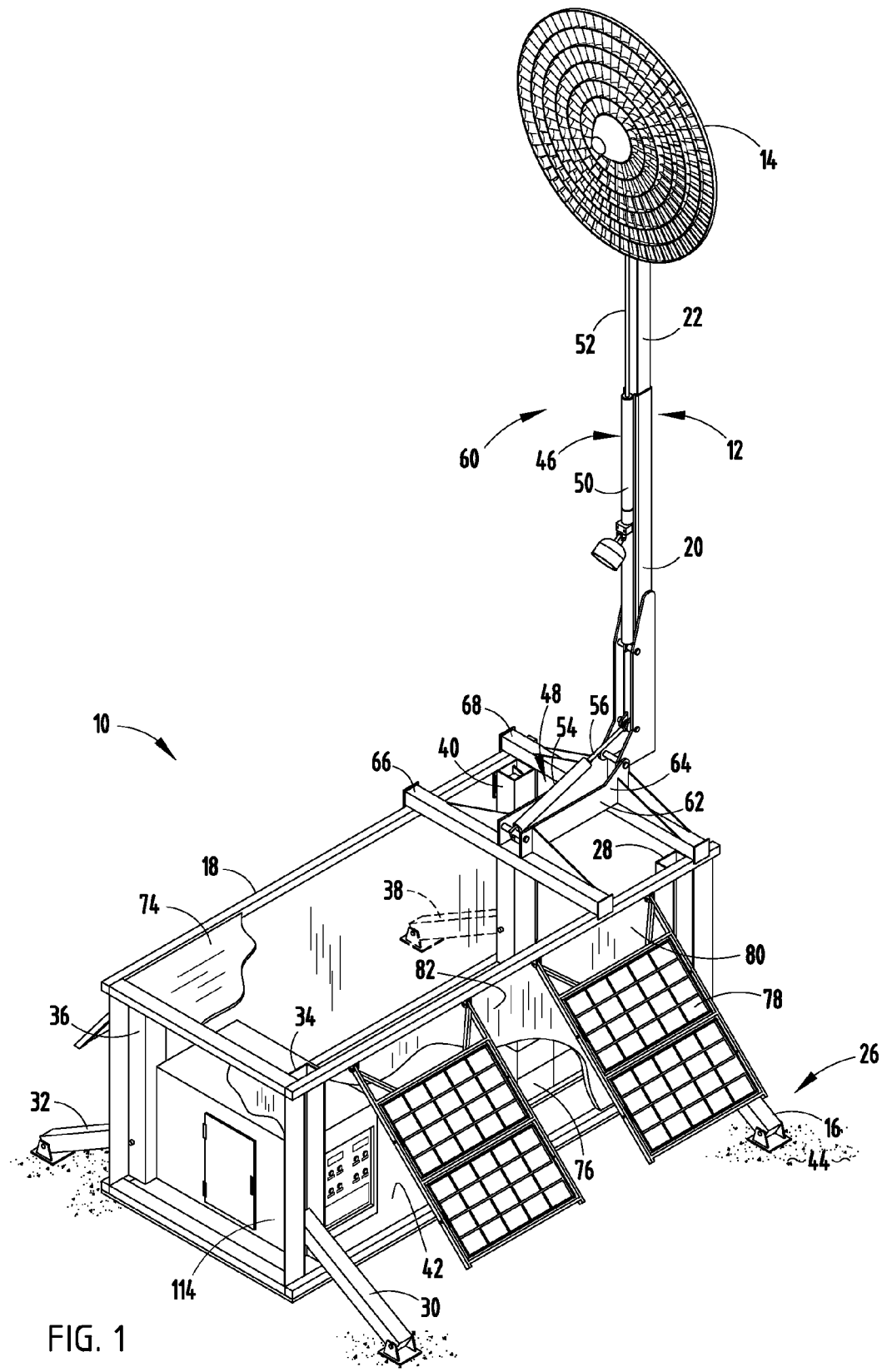
FIG. 1 depicts a perspective view of a first embodiment of a mobile electricity generator 10 with the first retractable leg 16 in an extended position 26.

For purposes of description herein, the terms "upper," "lower," "right," "left," "rear," "front," "vertical," "horizontal," and derivatives thereof shall relate to the embodiments as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

In a first embodiment, as shown in FIG. 1, mobile electricity generator 10 can comprise a telescopic boom 12, a wind turbine 14, a first retractable support leg 16, and a base 18. The telescopic boom 12 can comprise a first end 20 and a second end 22. The wind turbine 14 can be attached to the second end 22 of the telescopic boom 12 and the wind turbine 14 is capable of transforming wind into electricity. More specifically, the wind turbine 14 converts the kinetic energy of wind into mechanical energy, which is further converted into electricity. The first end 20 of the telescopic boom 12 can be attached to the base 18. The first retractable support leg 16 can be attached to the base 18. The wind turbine 14 can take any form, such as the traditional three-blade form, or the novel form described herein below. Ventera Energy (Duluth, Minn.) manufactures a three-blade wind turbine. Southwest Windpower (Flagstaff, Ariz.) manufactures a two-blade wind turbine under the trade name Whisper 500, and a three-blade wind turbine under the trade name Skystream. The telescopic boom 12 should be made from a material that is sufficiently sturdy to support the turbine 14 in use, such as steel or aluminum.

Figure 2:
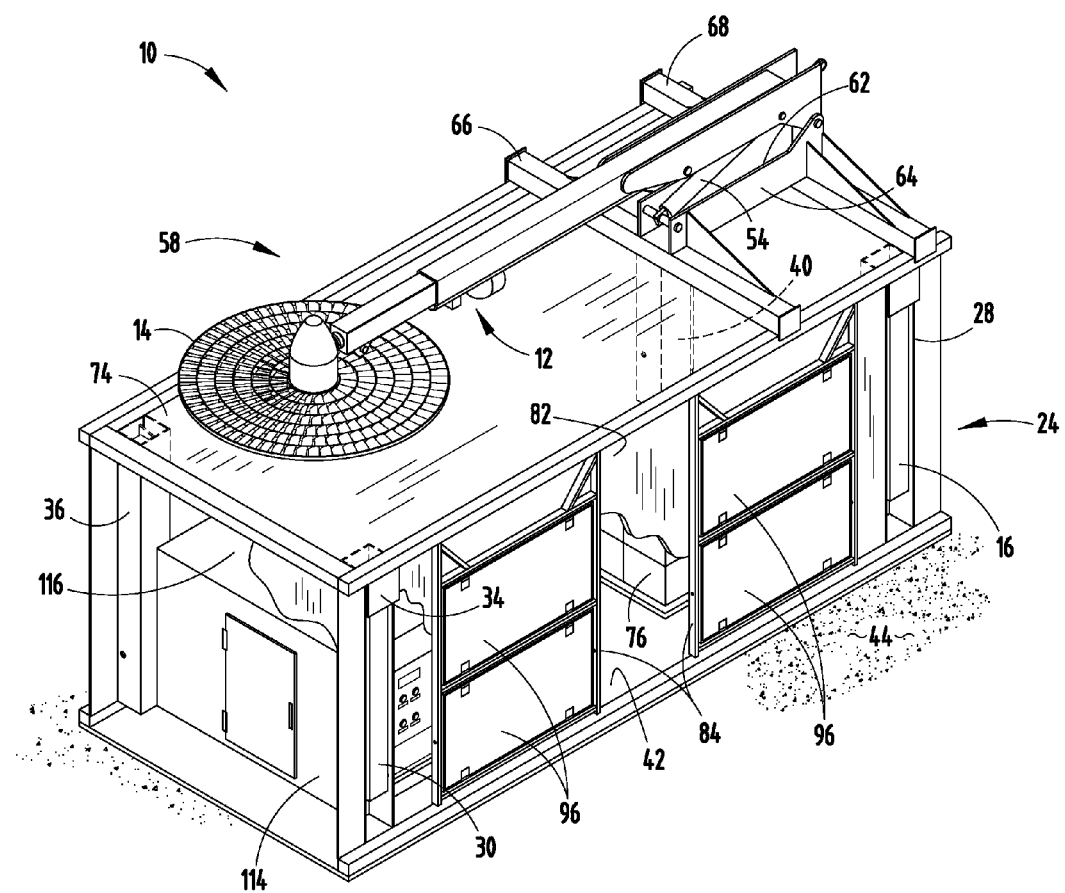
FIG. 2 depicts a perspective view of a first embodiment of a mobile electricity generator 10 with the first retractable leg 16 in a retracted position 24.

The first retractable support leg 16 can be capable of both a retracted position 24, as shown in FIG. 2, and an extended position 26, as shown in FIG. 1. The base 18 can comprise a first housing 28 that can at least partially house the first retractable support leg 16 when the first retractable support leg 16 is in the retracted position 24.

The mobile electricity generator 10 can further comprise a second retractable support leg 30 and a third retractable support leg 32. The second retractable support leg 30 and the third retractable support leg 32 can both be capable of both a retracted position (as shown in FIG. 2) and an extended position (as shown in FIG. 1), much like the retracted position 24 and extended position 26 described for first retractable support leg 16. The base 18 can further comprise a second housing 34 that at least partially houses the second retractable support leg 30 when the second retractable support leg 30 is in the retracted position (as shown in FIG. 2) and a third housing 36 that at least partially houses the third retractable support leg 32 when the third retractable support leg 32 is in the retracted position (as shown in FIG. 2). A base 18 taking a rectangular form, as that of the embodiment shown in FIGS. 1 and 2, may find it beneficial to incorporate a fourth retractable support leg 38, which can be capable of both a retracted position (as shown in FIG. 2) and an extended position (as shown in FIG. 1). In such an embodiment, the base 18 can further comprise a fourth housing 40 that at least partially houses the fourth retractable support leg 38 when the fourth retractable support leg 38 is in the retracted position (as shown in FIG. 2). The base 18 can comprise as many retractable support legs as the shape of the base 18 and the force generated by wind hitting the wind turbine 14 may require to hold the telescopic boom 12 upright while in use (that is, while in the active position 60) and prevent the mobile electricity generator 10 from tipping over. The retractable support legs can be manipulated through manual cranks, hydraulics, or electric motors.

The base 18 can further comprise a bottom surface 42. The bottom surface 42 can at least partially touch a ground surface 44 when the first retractable support leg 16, the second retractable support leg 30, the third retractable support leg 32, and in this embodiment, the fourth retractable support leg 38, are in their respective retracted positions (as shown in FIG. 2). In contrast, the bottom surface 42 may not touch the ground surface 44 when the first retractable support leg 16, the second retractable support leg 30, the third retractable support leg 32, and in this embodiment, the fourth retractable support leg 38, are in their respective extended positions (as shown in FIG. 1), although such a lifting effect is unnecessary. The base 18 can be generally rectangular in shape (such as dimensions of 8 feet×8 feet×20 feet) but can take a variety of shapes and sizes. The base 18, among other things, can serve the purpose of at least partially covering electronic parts and the fuel-based generator 114, and providing a base for any solar panels used, such as first solar panel 78, and telescopic boom 12. The base 18 can be made from steel.

The mobile electricity generator 10 can further comprise an extension hydraulic cylinder 46 and an active hydraulic cylinder 48. The extension hydraulic cylinder 46 can comprise a cylinder base 50 and a piston end 52. The active hydraulic cylinder 48 can comprise a cylinder base 54 and a piston end 56. The piston end 52 of the extension hydraulic cylinder 46 can be hinged to the second end 22 of the telescopic boom 12. The cylinder base 50 of the extension hydraulic cylinder 46 can be attached (such as hinged) to the first end 20 of the telescopic boom 12. The extension hydraulic cylinder 46 can be capable of causing the second end 22 of the telescopic boom 12 to telescopically move away from the first end 20 of the telescopic boom 12. In other words, activation of the extension hydraulic cylinder 46 causes the piston end 52 to extend away from the cylinder base 50 and thus cause second end 22 of the telescopic boom 12 to move away from the first end 20 of the telescopic boom 12, and deactivation of the extension hydraulic cylinder 46 causes the piston end 52 to retract into the cylinder base 50 and thus cause second end 22 of the telescopic boom 12 to move into the first end 20 of the telescopic boom 12. For example, the part of the telescopic boom 12 nearest the first end 20 can be a relatively larger tube, while the part of the telescopic boom 12 nearest the second end 22 can be a relatively smaller tube, and the smaller tube can slide in and out of a larger tube. The piston end 56 of the active hydraulic cylinder 48 can be hinged to the first end 20 of the telescopic boom 12. The cylinder base 54 of the active hydraulic cylinder 48 and the first end 20 of the telescopic boom 12 can be hinged to the base 18 directly (such as on the top surface 74) or via a support structure as shown in FIGS. 1 and 2 and described in more detail below. The telescopic boom 12 can be capable of a resting position 58 (as shown in FIG. 2) and an active position 60 (as shown in FIG. 1). The active hydraulic cylinder 48 can be capable of causing the telescopic boom 12 to move between the resting position 58 and the active position 60. In other words, activation of the active hydraulic cylinder 48 causes the piston end 56 to extend away from the cylinder base 54 and thus cause first end 20 of the telescopic boom 12 to move from a relative horizontal position (resting position 58) to a relative vertical position (active position 60) relative to the ground surface 44, and deactivation of the active hydraulic cylinder 48 causes the piston end 56 to retract into the cylinder base 54 and thus cause first end 20 of the telescopic boom 12 to move from a relative vertical position (active position 60) to a relative horizontal position (resting position 58) relative to the ground surface 44. The wind turbine 14 is better able to generate electricity when in the active position 60 rather than the resting position 58. At the resting position 58, the telescopic boom 12 can be approximately parallel to the top surface 74 of the base 18, and the wind turbine 14 can at least partially lie against the top surface 74 of the base 18. Consequently, the turbine 14 will be less prone to rotate and will generally block less sunlight, which would be advantageous for the ability of the solar panels, such as first solar panel 78, to generate electricity. At the active position 60, the telescopic boom 12 can be approximately perpendicular to the top surface 74 of the base 18, and the wind turbine 14 is able to rotate. It may be advantageous for electricity generation to place the telescopic boom 12 in the active position 60 while the wind is blowing, and in the resting position 58 when it is not.

The mobile electricity generator 10 can further comprise a boom support 62. The boom support 62 can be added to the base 18 to add structural rigidity to the mobile electricity generator 10, so that the generator 10 can withstand the forces generated when the telescopic boom 12 is in the active position 60 and wind is hitting the wind turbine 14. The boom support 62 can comprise a lateral support 64, a first end 66, and a second end 68. The boom support 62 can be attached to the base 18, for example by attaching the ends of the first end 66 and second end 68 to the base 18. The lateral support 64 separates the first end 66 from the second end 68. The cylinder base 54 of the active hydraulic cylinder 48 can be hinged to the first end 66 of the boom support 62. The first end 20 of the telescopic boom 12 can be hinged to the second end 68 of the boom support 62.

Figure 3:
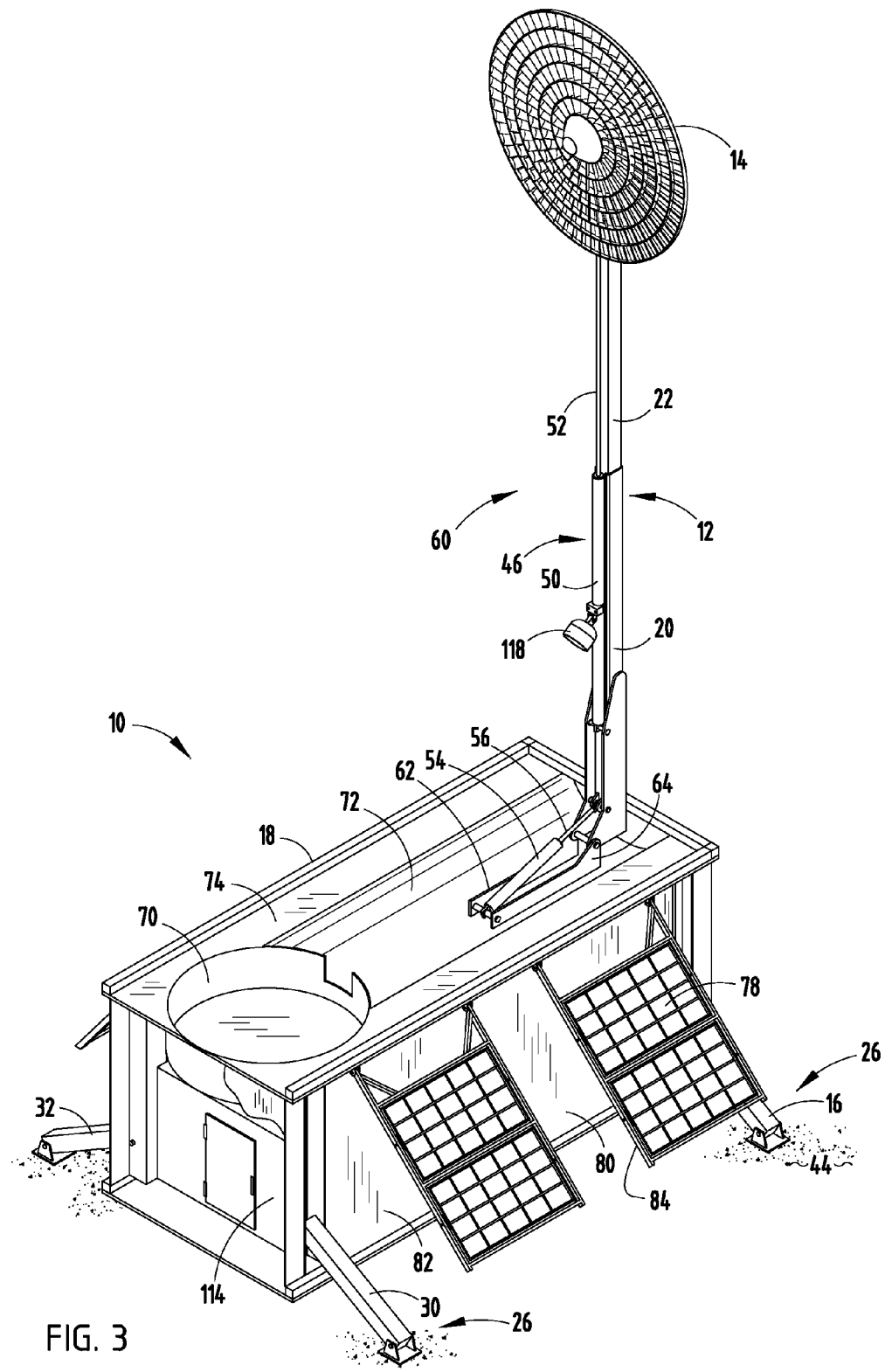
FIG. 3 depicts a perspective view of a second embodiment of a mobile electricity generator 10 with the turbine cave 70 and the boom cave 72 and the telescopic boom 12 in the active position 60.
Figure 4:
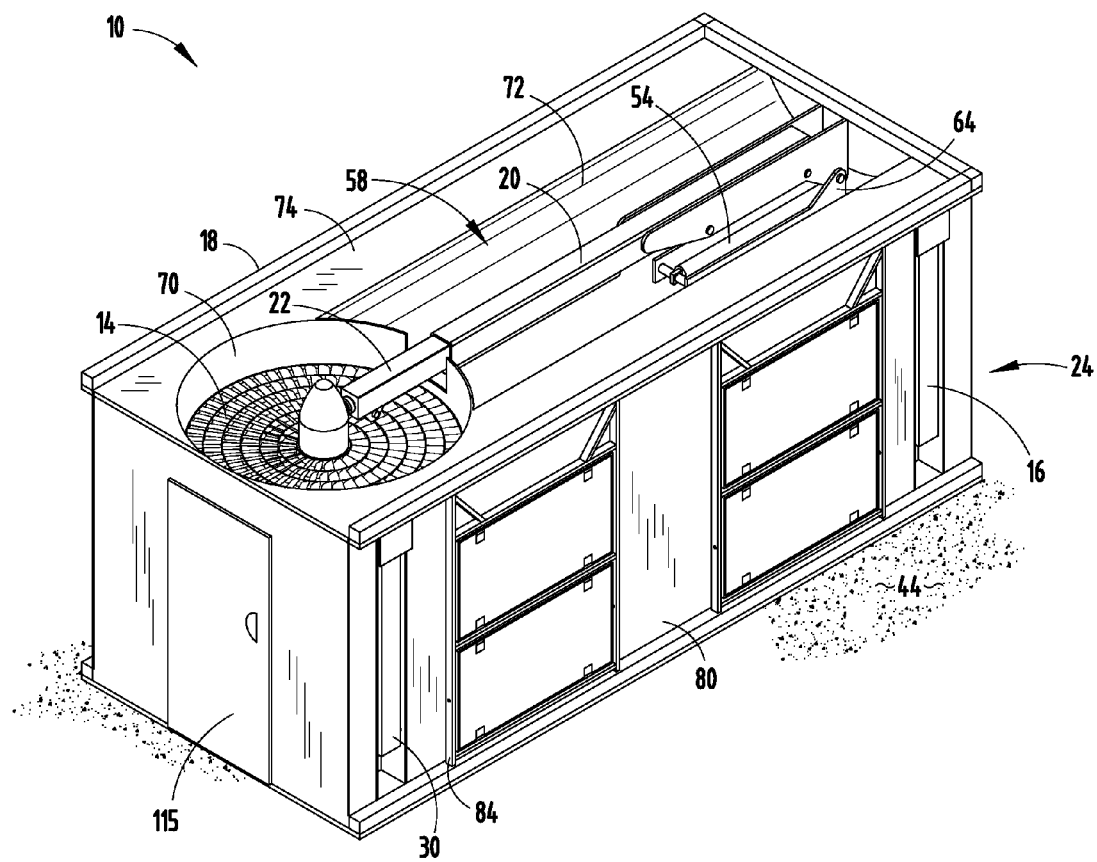
FIG. 4 depicts a perspective view of a second embodiment of the mobile electricity generator 10 with the turbine cave 70 and the boom cave 72 and the telescopic boom 12 in the resting position 58.

As shown in FIGS. 3 and 4, in another embodiment, the base 18 can further comprise a turbine cave 70, a boom cave 72, and a top surface 74. The first end 20 of the telescopic boom 12 can be hinged to the base 18 within the boom cave 72. The cylinder base 54 of the active hydraulic cylinder 48 can be hinged to the base 18 within the boom cave 72. When the telescopic boom 12 is in the resting position 58 (FIG. 4), the boom cave 72 can at least partially surround the telescopic boom 12 and the turbine cave 70 can at least partially surround the wind turbine 14, such that the top surface 74 of the base 18 is more highly elevated relative to the ground surface 44 than the telescopic boom 12 and the wind turbine 14. This design can allow stacking of one mobile electricity generator 10 on top of another generator 10, which can be beneficial for transportation of multiple generators 10.

The mobile electricity generator 10 can further comprise a first solar panel 78, as shown in FIG. 1. The first solar panel 78 can be capable of transforming light into electricity and is also known as a photovoltaic module or panel. More specifically, the first solar panel 78 is an interconnected assembly of photovoltaic cells, which are thought to transform light energy (photons) from the sun into electricity. The base 18 can further comprise an external surface 80, which in this embodiment includes top surface 74 and side surface 82. The first solar panel 78 can be attached to the base 18 such that the external surface 80 of the base 18 does not impede the first solar panel's 78 access to sunlight. The first solar panel 78 can be in electric communication with the battery 76, which can be capable of at least temporarily storing the electricity generated by the first solar panel 78. The mobile electricity generator 10 can comprise any number of additional solar panels, because the more solar panels 78 that are present, the more electricity the mobile electricity generator 10 can produce. The mobile electricity generator 10 can include a solar monitor and an inverter (discussed more fully below). Each solar panel, including first solar panel 78, can be manipulated to optimally position the light-collecting surface of each solar panel towards the sun. Sharp Electronics (New Jersey) makes such solar panels.

Figure 5A:
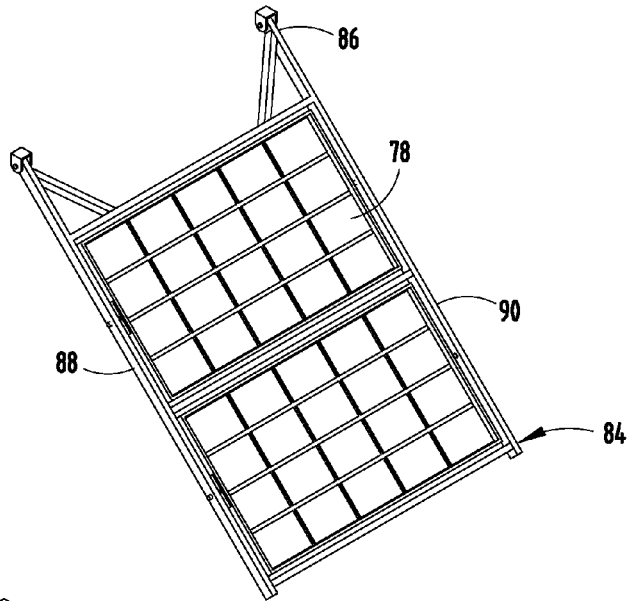
FIGS. 5A-C depict a perspective view of the solar panel swing 84, according to one embodiment.
Figure 5B:
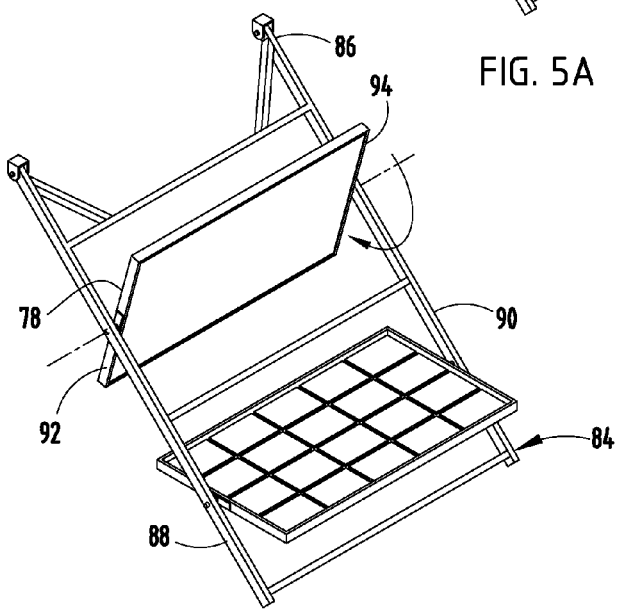
Figure 5C:
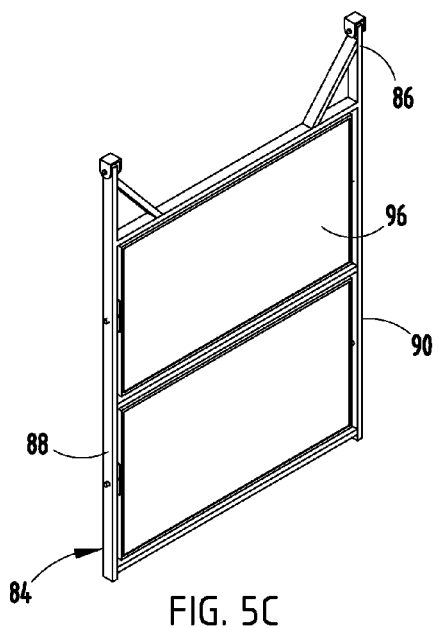

As shown enlarged in FIGS. 5A-5C, the mobile electricity generator 10 can further comprise a solar panel swing 84. The solar panel swing 84 can comprise a first end 86, a first side bracket 88, and a second side bracket 90, which need not be separate pieces—the solar panel swing 84 can be a unitary structure. The first solar panel 78 can comprise a first side 92 and a second side 94. The first side 92 of the first solar panel 78 can be pivotally attached to the first side bracket 88 and the second side 94 of the first solar panel 78 can be pivotally attached to the second side bracket 90. The first end 86 of the solar panel swing can be hinged to the base 18, such as the external surface 80 of the base 18 (as shown in FIG. 1). A protective cover 96 can be placed over the back of the first solar panel 78. In use, the solar panel swing 84 can be positioned to provide the most advantageous angle relative to the sun for the first solar panel 78, as shown in FIG. 3. When not in use, the first solar panel 78 can be rotated (as shown in the progression of FIGS. 5A-5C) so that the protective cover 96 is exposed and the solar panel swing 84 lies approximately flush against the external surface 80 of the base 18, as shown in FIG. 4. The mobile electricity generator can include any number of additional solar panel swings 84, as shown in FIG. 3. Each solar panel swing 84 can include any number of additional solar panels in a similar manner, and FIGS. 5A-5C show two solar panels.

Figure 6:
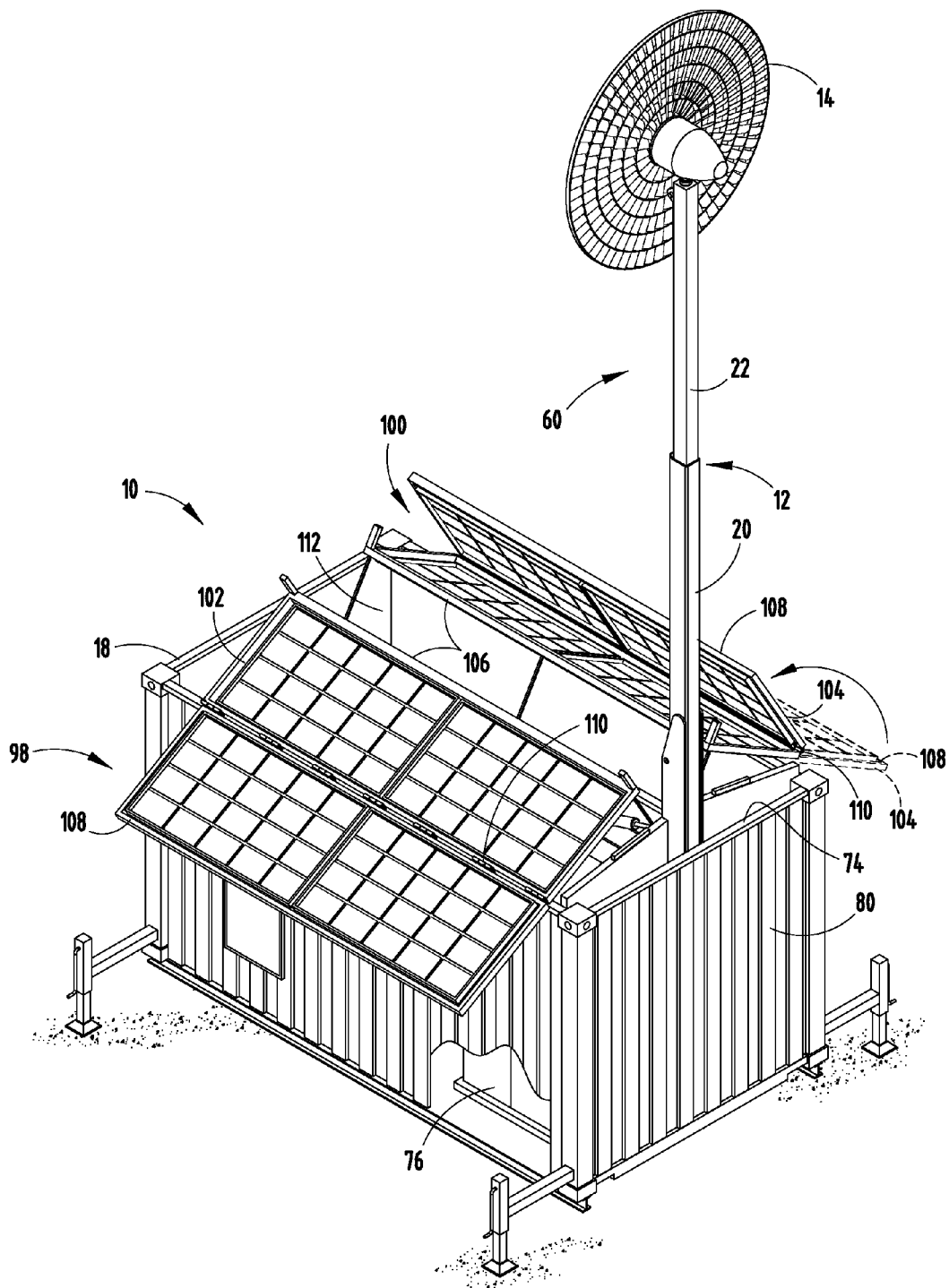
FIG. 6 depicts a perspective view of another embodiment of the mobile electricity generator 10 with a first solar panel array 98 and a second solar panel array 100.

As shown in FIG. 6, the mobile electricity generator 10 can further comprise a first solar panel array 98 and a second solar panel array 100. The first solar panel array 98 can be capable of transforming light into electricity. The second solar panel array 100 can be capable of transforming light into electricity. The first solar panel array 98 and the second solar panel array 100 can be attached to the external surface 80 of the base 18. The first solar panel array 98, and any other solar panel array utilized, can be in electric communication with the battery 76.

The mobile electricity generator 10 can further comprise a first array support 102 and a second array support 104. The first array support 102 and the second array support 104 can each comprise a first portion 106 and a second portion 108. The second portion 108 can be attached to the first portion 106 at an array axis 110. The second portion 108 can rotate relative to the first portion 106 about the array axis 110. This arrangement allows the second portion 108 to fold onto the first portion 106, which narrows the profile of the generator 10 for transportation purposes and protects the solar panels during transport. At least part of the first solar panel array 98 can be attached to the first portion 106 of the first array support 102 and at least part of the first solar panel array 98 can be attached to the second portion 108 of the first array support 102. In other words, both the first portion 106 and the second portion 108 of the first solar panel array 98 can support solar panels (such as first solar panel 78). Likewise, at least part of the second solar panel array 100 can be attached to the first portion 106 of the second array support 104 and at least part of the second solar panel array 100 can be attached to the second portion 108 of the second array support 104. A boom alley 112 can separate the first solar panel array 98 and the second solar panel array 100. The telescopic boom 12 can be capable of being within boom alley 112 when the telescopic boom 12 is in the resting position 58.

The mobile electricity generator 10 can further comprise a fuel-based generator 114 as shown in FIG. 1. The fuel-based generator 114 can be capable of transforming fuel into electricity. The fuel-based generator 114 can be in electric communication with the battery 76. The base 18 can further comprise an inner chamber 116 (see FIG. 2), such as an inner chamber 116 created by the bottom surface 42, the top surface 74, and the side surfaces 82. The inner chamber 116 can at least partially house the fuel-based generator 114 and the battery 76. A fuel-based generator 114 is typically the combination of a combustion engine and an electrical generator (alternator). The fuel-based generator 18 can supply 220 volt alternating current. The fuel-based generator 114 can be supplied by Caterpillar, Cummins, or John Deere, among others. The fuel for the fuel-based generator 114 can be diesel fuel, but can also be without limitation biodiesel, natural gas, hydrogen, wood, oil, or gasoline.

The mobile electricity generator 10 can further comprise a battery 76 ("battery" includes a bank of batteries 76) at least partially stored in the inner chamber 116 of the base 18. The battery 76 is in electric communication with the wind turbine 14, solar panels 78, 146, 98, and 100, and the fuel-based generator 114. The battery 76 is capable of at least temporarily storing the electricity generated from those elements. The battery 76 can be a bank of 12 volt deep cycle, zero maintenance, batteries. Both the wind turbine 14 and the solar panels 78, 146, 98 typically generate direct current electricity and that direct current electricity can be conducted to the battery 76, with alternatively a current and voltage measurement device and display placed between. Hawker (Ooltewah, Tenn.) makes such a battery, as does U.S. Battery Manufacturing Co. (Evans, Ga.), and Surrette Battery Company under the trademark Rolls. The direct current electricity generated by the wind turbine 14 and the solar panels 78, 146, 98 can alternatively bypass the battery 76 (if, for example, the battery 76 is fully charged) and be directed directly to the length of direct current cable 346 (discussed below) or the inverter 352 (discussed below) and the associated length of alternating current cable 354 (discussed below). There can be an access door 115 to provide human access into the inner chamber 116, as shown in FIG. 4.

The mobile electricity generator 10 can further comprise a light source 118 attached to the telescopic boom 12, such as the first end 20 of the telescopic boom 12, or on the cylinder base 50.

Figure 13:
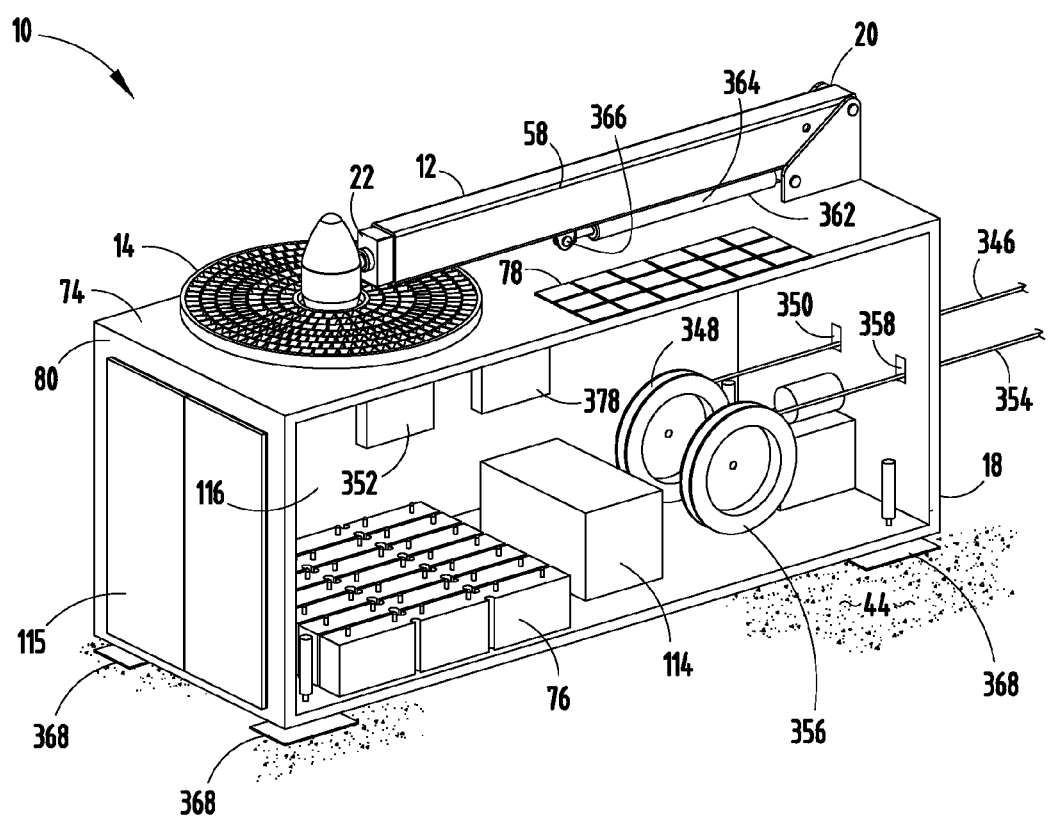
FIG. 13 depicts a perspective view of another embodiment of the mobile electricity generator 10 with the telescopic boom 12 in the resting position 58 and the wind turbine 14 not covering the first solar panel 78.
Figure 14:
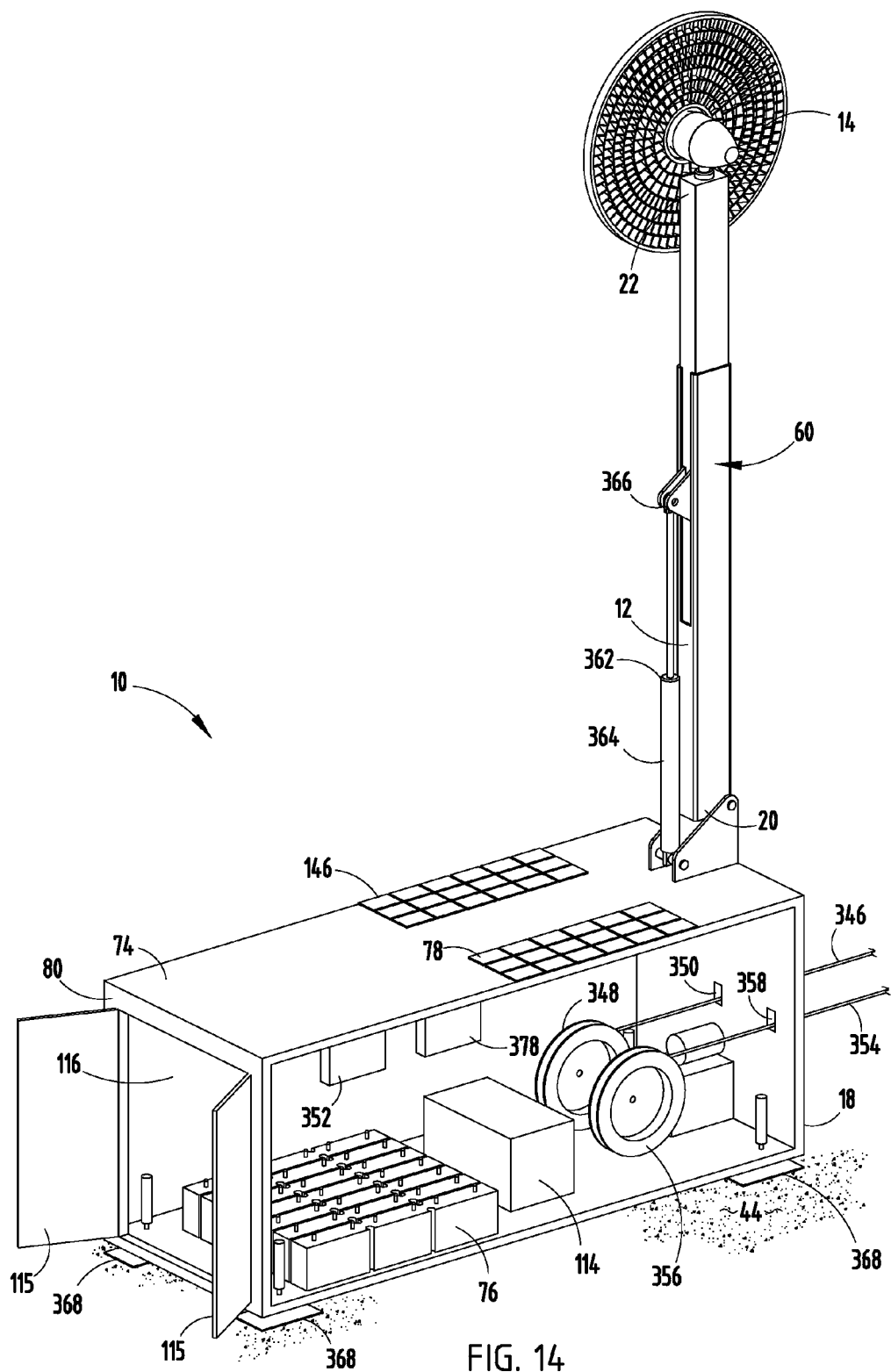
FIG. 14 depicts a perspective view of the embodiment of the mobile electricity generator 10 of FIG. 13 with the telescopic boom 12 in the active position 60.

In another embodiment of the mobile electricity generator 10, as shown in FIGS. 13 and 14, the telescopic boom 12 can be positioned relative to the first solar panel 78 so that the telescopic boom 14 does not cover the first solar panel 78 when the telescopic boom 14 is in the resting position 58, even when the solar panels are placed onto the top surface 74. FIGS. 13 and 14 show the base 18 with the near most wall removed to show the contents of the inner chamber 116.

In this embodiment, the mobile electricity generator 10 further comprises at least one leveler 368 in communication with the ground surface 44, wherein the at least one leveler 368 is capable of moving the plane defined by the top surface 74 of the base 18. For example, base 12 can comprise four levelers 368, one attached to each corner of the base 18 nearest the ground surface 44, and each independently controllable. Such leveling capability is advantageous when the telescopic boom 12 is to be moved to the active position 60 so that the top surface 74 is perfectly leveled (and/or the generator 10 perfectly balanced), otherwise the rotation of the turbine 14 would cause the mobile electricity generator 10 to rock and potentially break. The levelers 368 can be manipulated by hydraulic or electronic motor means. For example, a combination of a high-pressure hydraulic line and a low-pressure hydraulic line (not shown) can be supplied to each leveler 368, to allow for both large and minute movements of the leveler 368. The levelers 368 can be external to the base 18 and connected to the base 18 via scaffolding (not shown). Such an embodiment would further stabilize the base 18 when the telescopic boom 12 is in the active position 60. The base 18 can display a leveling gauge (not shown).

In this embodiment, the telescopic boom 12 can move between the resting position 58 (FIG. 13) and the active position 60 (FIG. 14) via just one hydraulic cylinder 362 comprising a cylinder base 364 and a piston end 366. The cylinder base 364 is hinged to the top surface 74 of the base 18 and the piston end 366 is hinged to the first end 20 of the telescopic boom 12. Therefore, as the hydraulic cylinder 362 is activated, the piston end 366 moves away from the cylinder base 364 and thus forces the telescopic boom 12 to move to the active position 60. As the hydraulic cylinder 362 raises the telescopic boom 12 to the active position 60, the first end 20 telescopes away from the second end 22 (and thus extending the length of the telescopic boom 12) via a cable pulley system (not shown). When the telescopic boom 12 is in the active position 60, the length of the telescopic boom 12 can be approximately thirty-five feet. As the hydraulic cylinder 362 is manipulated to lower the telescopic boom 12 to the resting position 58, the first end 20 telescopes towards the second end 22 (and thus shortens the length of the telescopic boom 12) via the cable system (not shown).

The mobile electricity generator 10 can further comprise a length of direct current cable 346 capable of conducting direct current. The length of direct current cable 346 is at least partially housed within the inner chamber 116 of the base 18 and in electric communication with the battery 76 (to draw electricity from battery 76) and in electric communication with each of the turbine 14, any solar panel, such as first solar panel 78, and fuel-based generator 114 to draw direct current electricity from those electricity producing elements. A bank of switches can alter the voltage of the direct current running from the battery 76 through the length of direct current cable 346, for example 12 volt and 24 volt.

The mobile electricity generator 10 can further comprise a first reel 348 at least partially housed within the inner chamber 116 of the base 18. Part of the length of direct current cable 346 can be reeled around first reel 348 and the reel 348 can be wound in either direction, depending on whether the length of direct current cable 346 needs to be returned to the inner chamber 116 of the base 18 or drawn from the inner chamber 116 of the base 18, such as when in use. Moreover, the base 18 can further comprise a first aperture 350 through which at least part of the length of direct current cable 346 can extend from the inner chamber 116 of the base 18 to an area external to the base 18, for connection to a device that requires electricity to work. Including a length of direct current cable 346 allows the user to keep the device that needs electricity in its current position, eliminating the need to bring the device that needs electricity to the mobile electricity generator 10.

The mobile electricity generator 10 can further comprise an inverter 352 at least partially housed within the inner chamber 116 of the base 18 and in electronic communication with the battery 76 and also with the turbine 14 and any solar panels, such as first solar panel 78. The inverter 352 is capable of converting electricity, such as electricity from the battery 76, into alternating current, such as 110 volt alternating current. Outback Power Technologies (Arlington, Wash.) makes such an inverter, as does SMA America, LLC under the trade name Sunny Boy. (In such an embodiment, the mobile electricity generator 10 further comprises a length of alternating current cable 354 capable of conducting alternating current. The length of alternating current cable 354 is at least partially housed within the inner chamber 116 of the base 18 and in electric communication with the inverter 352 and/or the fuel-based generator 114 and thus provides the same advantage as the length of direct current cable 346 described above. In such an embodiment, the mobile electricity generator 10 further comprises a second reel 356 at least partially housed within the inner chamber 116 of the base 18 and capable of accepting the length of alternating current cable 354. Part of the length of alternating current cable 354 can be reeled around second reel 356 and the second reel 356 can be wound in either direction, depending on whether the length of alternating current cable 354 needs to be returned to the inner chamber 116 of the base 18 or extracted from the inner chamber 116 of the base 18, such as when in use. Moreover, the base 18 can further comprise a second aperture 358 through which at least part of the length of alternating current cable 354 can extend from the inner chamber 116 of the base 18 to an area external to the base 18, for connection to a device that requires electricity to work. Both the first reel 348 and the second reel 356 can be spring wound reels.

The generator 10 can further comprise a monitoring station 378. The monitoring station 378 can include a display of the electricity that the turbine 14, solar panels (such as first solar panel 78), and fuel-based generator 114 are producing, as well as the electricity stored in the battery 76 and being drawn from the battery 76 via a length of direct current cable 346 and/or length of alternating current cable 354. All hydraulically or motor driven components (such as hydraulic cylinder 362 and levelers 68, in this embodiment, or extension hydraulic cylinder 46 and active hydraulic cylinder 48 in the above embodiments) draw the required electricity directly from the mobile electricity generator 10 itself, such as the battery 76 or, if the battery 76 has inadequate charge, the fuel-based generator 114.

Figure 7:
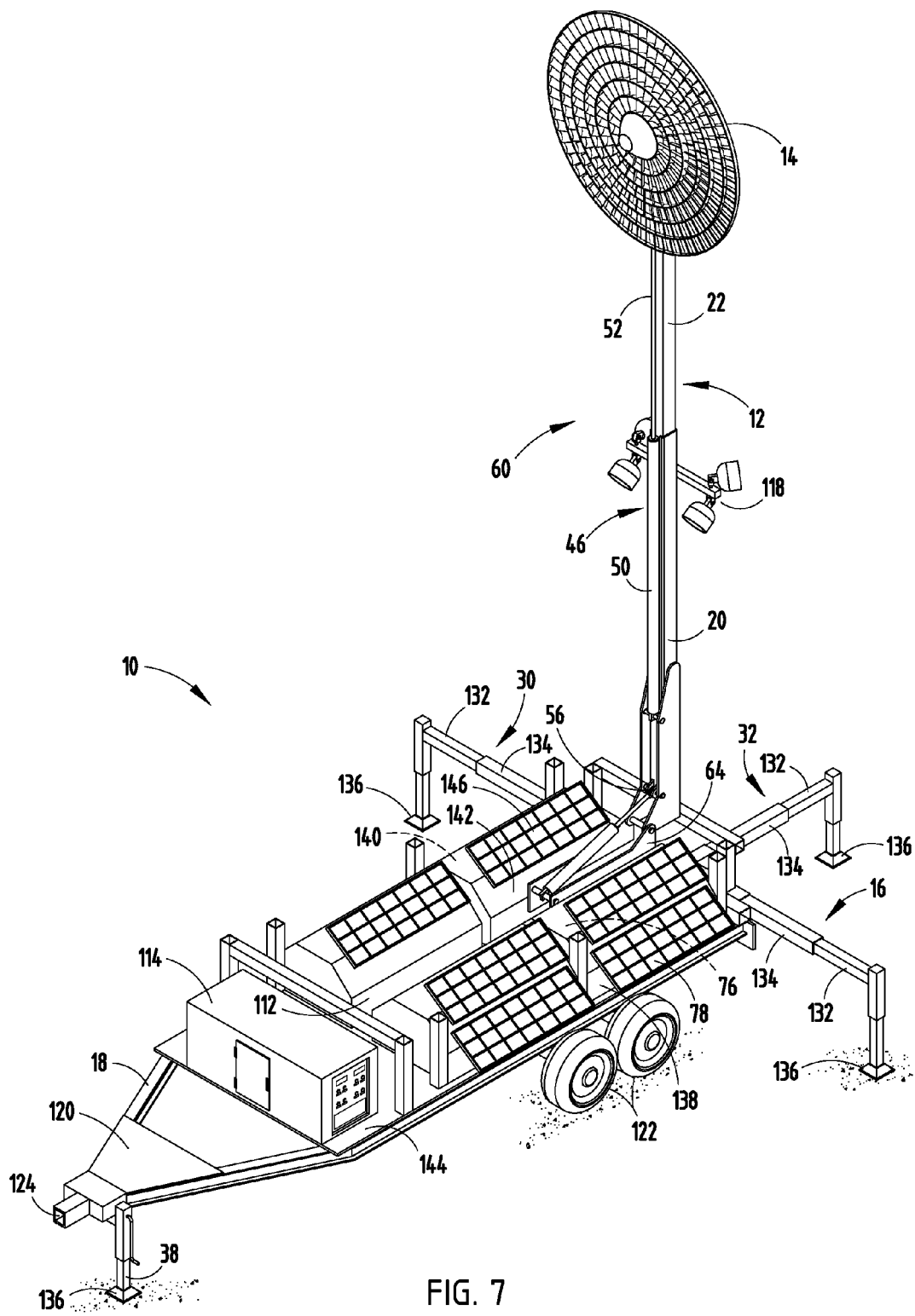
FIG. 7 depicts a perspective view of another embodiment of the mobile electricity generator 10 with the base 18 comprising a trailer 120.
Figure 8:
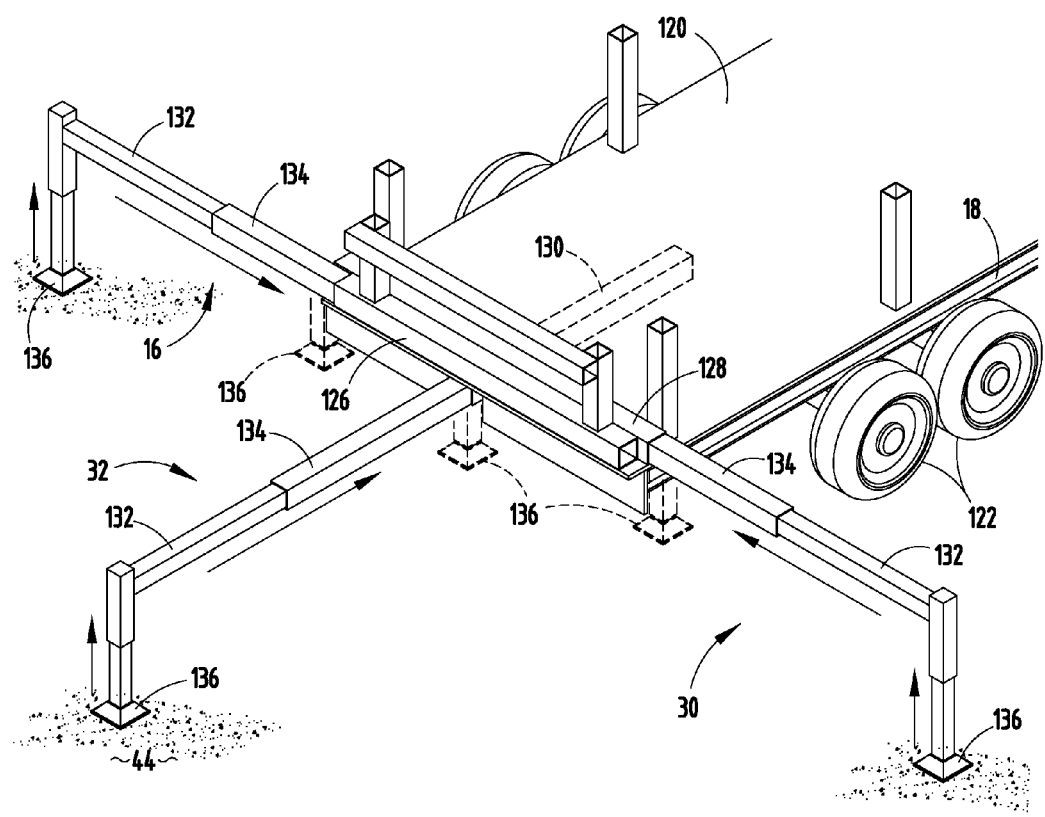
FIG. 8 depicts a rear perspective view of the trailer 120.
Figure 9:
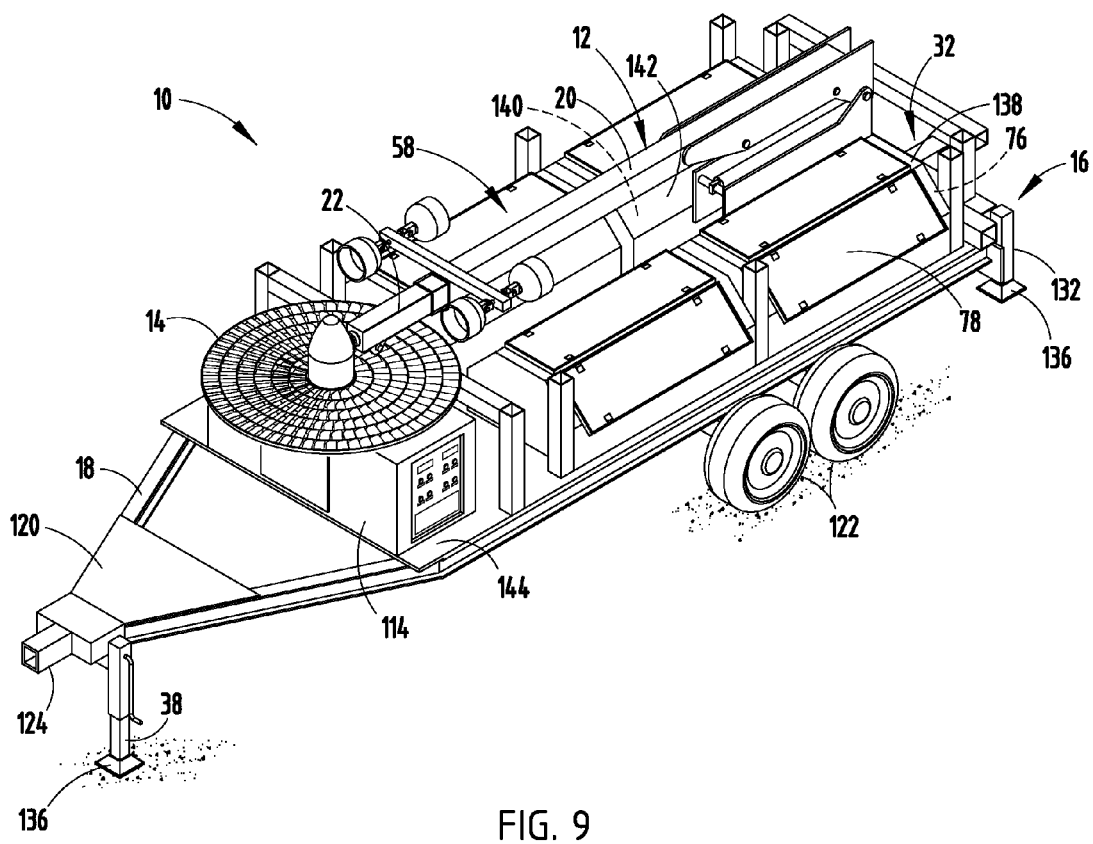
FIG. 9 depicts a perspective view of the trailer 120, with the telescopic boom 12 in the resting position 58.

In another embodiment of the mobile electricity generator 10, as shown in FIGS. 7-9, the base 18 can comprise a trailer 120. The trailer 120 can comprise at least two wheels 122, a hitch 124, a first housing 126, a second housing 128, and a third housing 130. The mobile electricity generator 10 can further comprise a first retractable support leg 16 (see FIG. 8), second retractable support leg 30, a third retractable support leg 32, and a fourth retractable support leg 38 (see FIG. 7). The first end 20 of the telescopic boom 12 can be hinged to the trailer 120 (see FIG. 7). The first retractable support leg 16 (see FIG. 8), the second retractable support leg 30, and the third retractable support leg 32 can all comprise a first part 132 and a second part 134. The first part 132 can comprise a support foot 136, and the first part 132 can be capable of telescoping into the second part 134. The second part 134 of the first retractable leg 16 can be capable of telescoping into the first housing 126. The second part 134 of the second retractable leg 30 can be capable of telescoping into the second housing 128. The second part 134 of the third retractable leg 32 can be capable of telescoping into the third housing 130. The support foot 136 can also telescope, so as to raise or lower the support foot 136 relative to the ground surface 44.

The mobile electricity generator 10 can further comprise a first solar panel 78 (see FIG. 7) and a first battery 76, both supported by the trailer 120. The first solar panel 78 can be capable of transforming light into electricity. The first battery 76 can be in electric communication with the wind turbine 14 and the first solar panel 78. The first battery 76 is capable of at least temporarily storing the electricity that the first solar panel 78 and/or the wind turbine 14 generate. The first battery 76 can be a collection of individual batteries.

The mobile electricity generator 10 can further comprise a first battery housing 138. The trailer 120 can support the first battery housing 138. The first battery housing 138 can at least partially house the first battery 76.

The mobile electricity generator 10 can further comprise a second battery 140 and a second battery housing 142. The trailer 120 can support the second battery housing 142. The second battery housing 142 can at least partially house the second battery 140. A boom alley 112 can separate the first battery housing 138 and the second battery housing 142. The telescopic boom 12 is capable of a resting position 58 (as shown in FIG. 9) and an active position 60 (as shown in FIG. 7). The telescopic boom 12 is capable of being within boom alley 112 when the telescopic boom 12 is in the resting position 58 (as shown in FIG. 9).

The trailer 120 can further comprise a platform 144. At the active position 60 (see FIG. 7), the telescopic boom 12 can be approximately perpendicular to the platform 144 and the wind turbine 14 can be able to rotate, in order to generate electricity.

The mobile electricity generator 10 can further comprise a second solar panel 146. The first solar panel 78 can be mounted upon the first battery housing 138. The second solar panel 146 can be mounted upon the second battery housing 142. It is possible that neither the telescopic boom 12 nor the wind turbine 14 cover either of the first solar panel 78 or the second solar panel 146, when the telescopic boom 12 is in the resting position 58, in the event that generation of electricity from sunlight would be advantageous but not from wind.

The mobile electricity generator 10 can further comprise a fuel-based generator 114 supported by the trailer 120, such as on platform 144. The fuel-based generator 114 can be capable of transforming fuel into electricity. A light source 118 can be attached to the telescopic boom 12, such as the first end 20 of the telescopic boom 12.

The mobile electricity generator 10 can provide electricity to a device that needs electricity. The generator 10 can provide electricity in whatever form the device requires, such as direct current or alternating current. The electricity can come from charged battery 76, or from one or more of the solar panels (such as first solar panel 78, second solar panel 146, first solar panel array 98, or second solar panel array 100), wind turbine 14, or fuel-based generator 114, using a converter, inverter, and other devices as needed. The device can be the light source 118.

Figure 10:
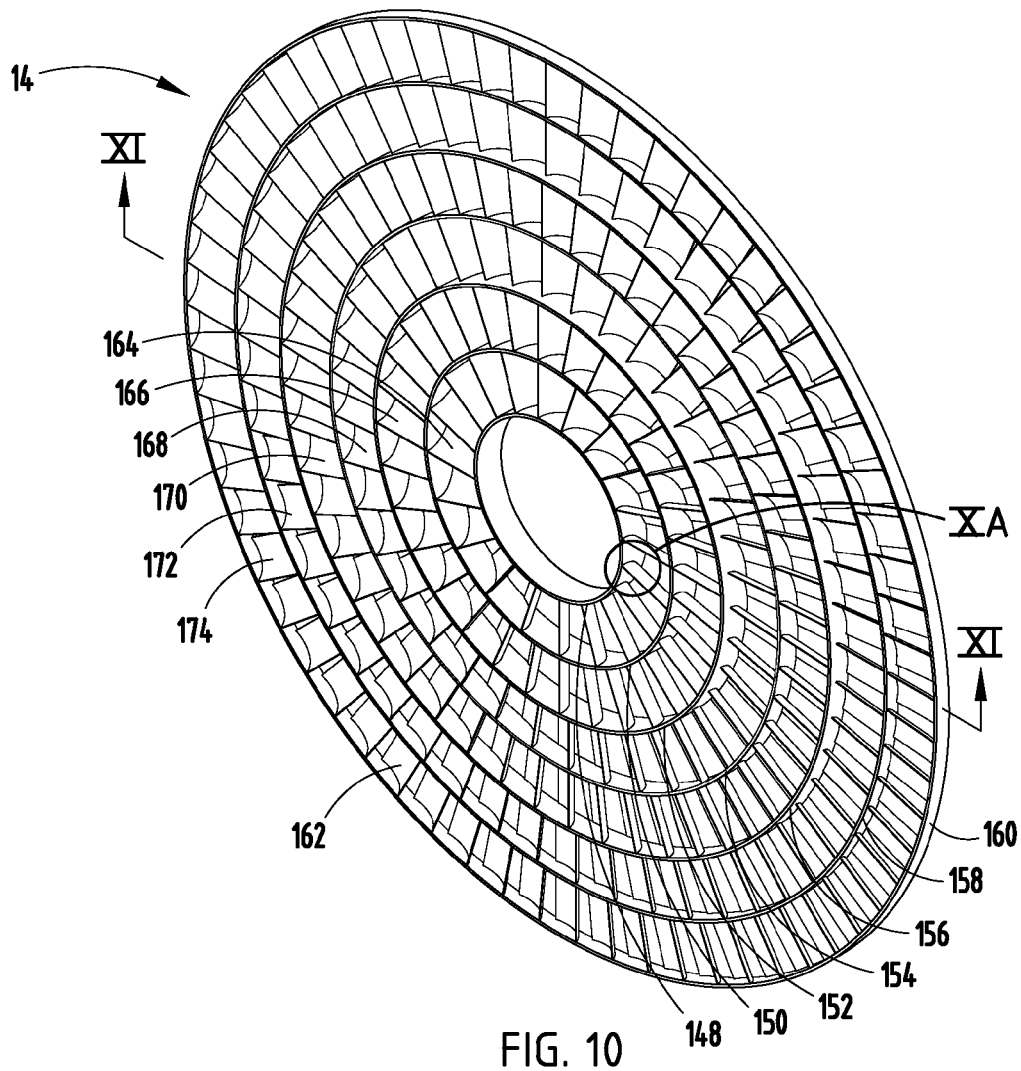
FIG. 10 depicts a perspective view of a first embodiment of a wind turbine 14.
Figure 11:
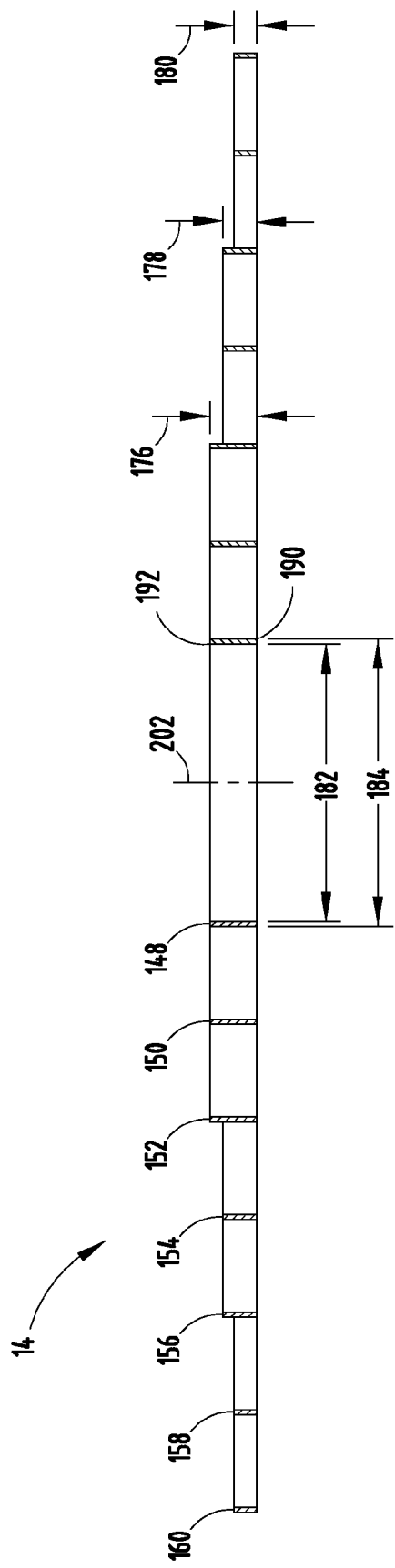
FIG. 11 depicts a side view of the first embodiment of the wind turbine 14 at cross section XI of FIG. 10.
Figure 12:
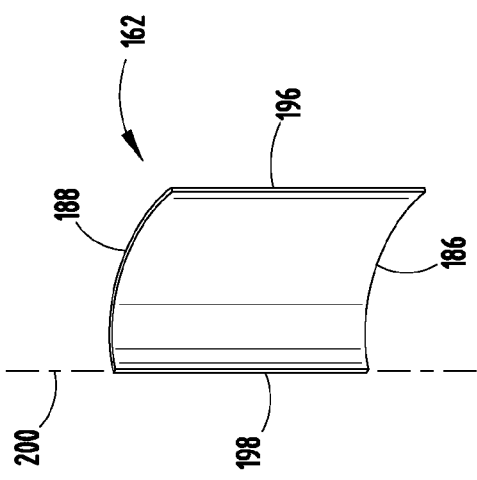
FIG. 12 depicts a perspective view of a fin 162 used for the first embodiment of the wind turbine 14.

In any embodiment of the mobile electricity generator 10, and as a stand-alone component that can be employed separately, on other electricity generators, as shown in FIGS. 10-12, the wind turbine 14 can comprise a series of rings, such as a first ring 148, a second ring 150, a third ring 152, a fourth ring 154, a fifth ring 156, a sixth ring 158, and a seventh ring 160. A number of fins 162 can be spaced between the rings. For example, in this embodiment, a first set 164 of fins 162 separates the first ring 148 from the second ring 150, a second set 166 of fins 162 separates the second ring 150 from the third ring 152, a third set 168 of fins 162 separates the third ring 152 from the fourth ring 154, a fourth set 170 of fins 162 separates the fourth ring 154 from the fifth ring 156, a fifth set 172 of fins 162 separates the fifth ring 156 from the sixth ring 158, and a sixth set 174 of fins 162 separates the sixth ring 158 from the seventh ring 160.

Each of the rings can comprise a width, and the width of the rings can generally decrease from the innermost rings towards to the outermost rings as generally shown in FIG. 11. In this embodiment, for example, the width 176 of the first ring 148, the second ring 150, and the third ring 152 is the same but is larger than the width 178 of the fourth ring 154 and the fifth ring 156, which in turn is larger than the width 180 of the sixth ring 158 and the seventh ring 160.

Each of the rings can comprise an inner diameter and an outer diameter. In this embodiment, for example, first ring 148 comprises an inner diameter 182 and an outer diameter 184. Each successive ring has an inherent inner diameter and outer diameter. In this embodiment, the inner diameter of the second ring 150 is larger than the outer diameter of the first ring 148, the inner diameter of the third ring 152 is larger than the outer diameter of the second ring 150, and so on.

Figure 10A:
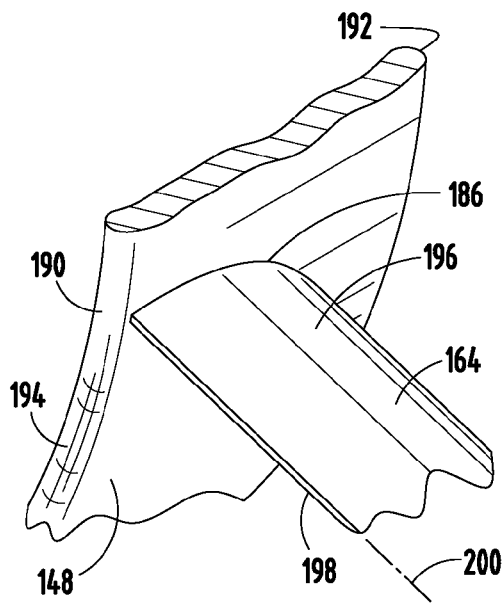
FIG. 10A depicts an enlarged partial top perspective view of area XA and FIG. 10.

As shown in FIG. 12, each fin 162 can comprise a first end 186 and a second end 188. The first end 186 of each of the first set 164 of fins 162 can be attached to the outer diameter 184 of the first ring 148, as shown in FIG. 10A. The second end 188 of each of the first set 164 of fins 162 can be attached to the inner diameter of the second ring 150. The first end 186 of each of the second set 166 of fins 162 can be attached to the outer diameter of the second ring 150, and the second end 188 of each of the second set 166 of fins 162 can be attached to the inner diameter of the third ring 152. The first end 186 of each of the third set 168 of fins 162 can be attached to the outer diameter of the third ring 152, and the second end 188 of each of the third set 168 of fins 162 can be attached to the inner diameter of the fourth ring 154. The first end 186 of each of the fourth set 170 of fins 162 can be attached to the outer diameter of the fourth ring 154, and the second end 188 of each of the fourth set 170 of fins 162 can be attached to the inner diameter of the fifth ring 156. The first end 186 of each of the fifth set 172 of fins 162 can be attached to the outer diameter of the fifth ring 156, and the second end 188 of each of the fifth set 172 of fins 162 can be attached to the inner diameter of the sixth ring 158. The first end 186 of each of the sixth set 174 of fins 162 can be attached to the outer diameter of the sixth ring 158, and the second end 188 of each of the sixth set 174 of fins 162 can be attached to the inner diameter of the seventh ring 160. In general, the first end 186 of each set of fins 162 is attached to the outer diameter of one ring and the second end 188 is attached to the inner diameter of the next larger concentric ring, so as to not be limited in the number of rings that the wind turbine 14 can have.

As shown in FIG. 10A, one or more of the rings, such as the first ring 148, can comprise a wind facing edge 190 and a wind trailing edge 192. The wind facing edge 190 can comprise a radial surface 194. As shown in FIGS. 10A and 12, each fin 162 can comprise a convex surface 196. As shown in FIG. 10, each of the first set 164 of fins 162 can be equally spaced, each of the second set 150 of fins 162 can be equally spaced, and so on, for each successive set of fins 162.

As shown in FIGS. 10A and 12, each of the fins 162 can comprise leading edge 198. The leading edge 198 can define an axis 200. The axis 200 of the fins 162 can be on approximately the same plane defined by wind facing edge 190 of the rings (more specifically, in this embodiment, the plane tangent to the apex of the radial surface 194 of the wind facing edge 190), such as the first ring 148, the second ring 150, and so on. The wind trailing edge 192 of the first ring 148 can define a trailing plane. In the embodiment depicted at FIG. 11, the wind trailing edges 192 of the second ring 150 and the third ring 152 define the same plane as the trailing plane of the first ring 148. By changing the position of each fin 162 of the first set 164 of fins 162 and the second set 166 of fins 162 relative to the axis 200, the convex surface 196 of each of those fins 162 can approximately touch the plane defined by the trailing plane of the first ring 148, the second ring 150, and the third ring 152. Likewise, because the width 178 of the fourth ring 154 and the fifth ring 156 is smaller than the width 176 of the first ring 148, the second ring 150, and the third ring 152, the wind trailing edges 192 of the fourth ring 154 and the fifth ring 156 lie in the same plane relative to each other but in a different plane relative to the plane defined by the wind trailing edges 192 of the first ring 148, the second ring 150, and the third ring 152. The position of each fin 162 of the third set 168 and fourth set 170 of fins 162 can be changed relative to the axis 200 so that the convex surface 196 of each of those fins 162 can approximately touch the plane defined by the wind trailing edges 192 of the fourth ring 154 and the fifth ring 156. Likewise, because the width 180 of the sixth ring 158 and the seventh ring 158 is smaller than the width 178 of the fourth ring 154 and the fifth ring 156, the wind trailing edges 192 of the sixth ring 158 and seventh ring 158 lie in the same plane relative to each other but in a different plane relative to the plane defined by the wind trailing edges 192 of the fourth ring 154 and the fifth ring 156. The position of each fin 162 of the fifth set 172 and sixth set 174 of fins 162 can be changed relative to the axis 200 so that the convex surface 196 of each of those fins 162 can approximately touch the plane defined by the wind trailing edges 192 of the sixth ring 158 and the seventh ring 160. In general, as the width of the rings get smaller in the outward from center direction, the position of each fin 162 of each of the sets of fins can be changed relative to the axis 200 so that the convex surface 196 of each of those fins 162 can approximately touch the plane defined by the trailing plane of the outermost ring to which the second end 188 of the fin 162 is attached.

The wind turbine 14 can further comprise an axis of turbine rotation 202. All rings, such as the first ring 148, the second ring 150, the third ring 152, and so on, can be concentric around the axis of turbine rotation 202. The axis 200 of each fin 162 is directed towards and approximately intersects the axis of turbine rotation 202.

A user can use any embodiments of the above mobile electricity generators 10 to provide electricity to a device that requires electricity. First the user presents an embodiment of the mobile electricity generator 10 described above to a location near where the generation of electricity is desired.

Second, the user allows one or more of the following events to occur—(i) allowing the wind turbine 14 to transform wind into electricity; (ii) allowing a solar panel (or more than one solar panels), such as first solar panel 78, second solar panel 146, first solar panel array 98, or second solar panel array 100, to transform light into electricity; and (iii) allowing the fuel-based generator 114 to transform fuel (such as diesel, gasoline, natural gas, ethanol, or any other fuel) into electricity. Typically, the solar panel will constantly transform light into electricity, if enough light energy is available from the sun, without user involvement—the user need simply allow the solar panel to do so. In order to allow the wind turbine 14 to transform wind into electricity, the user must cause the telescopic boom 12 to rise to the active position 60. If needed, the user can move the support legs, such as first retractable support leg 16, second retractable support leg 30, and third retractable support leg 32 to an extended position 26, or the levelers 68, to level and support the generator 10 before allowing the wind turbine 14 to transform wind into electricity. In order for the fuel-based generator 114 to transform diesel fuel into electricity, the user must place fuel into the engine portion of the fuel-based generator and activate the engine.

Third, the user presents a device that requires electricity to operate and, fourth, electrically connects the device that requires electricity to operate to the generator 10. If the generator 10 incorporates direct current cable 346 or alternating current cable 354, the user can connect the device to whichever cable supplies the type of electricity that the device requires. The generator 10 can be located anywhere, but may be best located where electricity is not already supplied, like a maritime vessel (especially when docked), a construction site, and a military base (especially a forward military base). The aforementioned steps need not occur consecutively.

Referring to FIGS. 15-26, a mobile electricity generator 10 is shown having a movable solar panel swing assembly 410, according to another embodiment. The mobile electricity generator 10 has a base 18 having side walls 82A-82D, a top wall 74 and a bottom wall 42 that define an interior volume

480, also referred to as an inner chamber. In the embodiment shown, the base 18 is rectangular having the four vertical side walls 82A-82D connected to the bottom wall 42 and the top wall 74 that generally define a rectangular internal volume. The base 18 may be generally equipped with one or more various components such as the wind turbine 14 and its telescopic boom shown stored on the top wall 74, a fuel-based generator 114 shown housed in the interior volume 480 and other components as shown and described in connection with the other embodiments disclosed herein.

The electricity generator 10 may be mobile and may include wheels operatively coupled to the base 18 for enhanced mobility. The electricity generator 10 shown in FIGS. 15-26 includes a movable solar panel swing assembly 410 comprising a support structure 402 shown as a movable wall connected to a first central solar panel swing 434 and disposed on a track assembly having upper track 450, lower track 460 and roller assemblies 452 and 462 for allowing movement of the solar panel swing assembly 410 between a stowed position within the internal volume 480 of the base 18 and a use position outside the internal volume 480 of the base 18. As such, the movable solar panel swing assembly 410 may be stowed within the internal volume 480 of the base 18 and may be deployed to an exposed exterior position and deployed by rotating or swinging solar panel arrays into position for use to receive sunlight and convert the sunlight to electricity. The central solar panel swing 434 includes one or more solar panel arrays that rotate or swing about a hinge or axle between a folded position and a use position. The central solar panel swing 434 includes upper and lower solar panel arrays 422 and 420 that pivot relative to pivot axle 424 between folded and unfolded positions. The central solar panel swing 434 has a supporting frame supported by the support structure 402. The support structure 402, in turn, has upper and lower roller assemblies 452 and 462 operatively coupled to the upper track 450 and lower track 460, respectively within the base 18, as shown in FIGS. 16 and 16A. Each of roller assemblies 452 and 462 has one or more rollers. As such, the support structure 402 and associated central solar panel swing 434 is movable on the upper and lower tracks 450 and 460 between an inward stowed position within the interior volume 480 of base 18 and an exposed outward position outside the internal volume 480 of base 18.

The base 18 also includes a pair of access doors 490 and 492 provided in side wall 82D that allow access to the components provided therein as shown in FIG. 16. The access doors 490 and 492 pivot in opposite directions between the closed position shown in FIG. 15 and the open position shown in FIG. 16.

In addition, the base 18 has first and second solar panel doors 400 and 402 provided in side wall 82A that pivot in opposite directions between open and closed positions. Each of the solar panel doors 400 and 402 has a solar panel swing coupled to the inside of the door. Each solar panel swing has one or more solar panel arrays that are rotatable to swing between a folded position and a use position when the corresponding solar panel door is in the open position. The first and second solar panel doors 400 and 402 stow the corresponding first and second solar panel swings 430 and 432 against the inside surface of the door when the solar panel doors 400 and 402 are in the closed position and cover the movable solar panel swing assembly 410 stored within the interior volume 480 of base 18.

A wind generator 14 is shown stowed on the top wall 74 and is deployable to a use position as shown and described herein in other embodiments. Disposed in the interior volume 480 of base 18 is a fuel-based generator 114 such as the type disclosed in other embodiments. Also stored within the internal volume 480 of the base 18 is an energy storage device 76 shown as a plurality of batteries capable of at least partially storing the electricity generated by the solar panels 78, the wind generator 14, the fuel-based generator 114, and any other electrical generating devices. The fuel-based generator 114 and batteries of energy storage device 76 may be supported on the top surface of a pallet 499 which allows for energy removal and replacement with a forklift.

Figure 15:
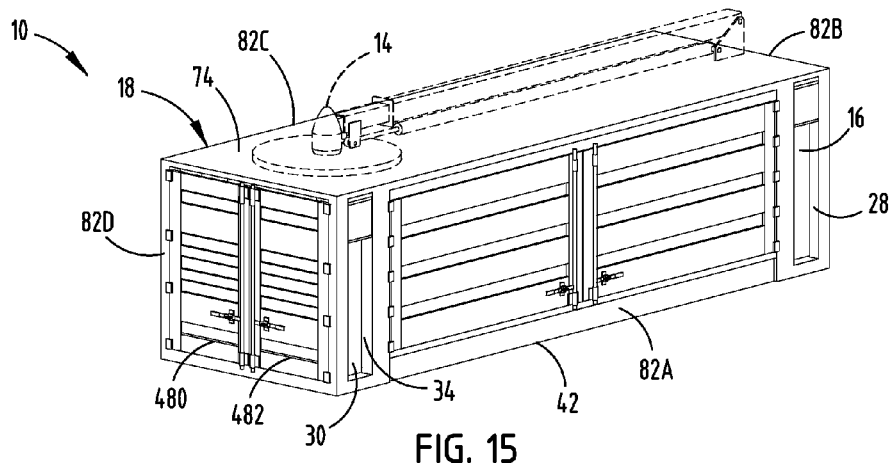
FIG. 15 depicts a perspective view of an electricity generator having a movable solar panel swing assembly, according to another embodiment.
Figure 16:
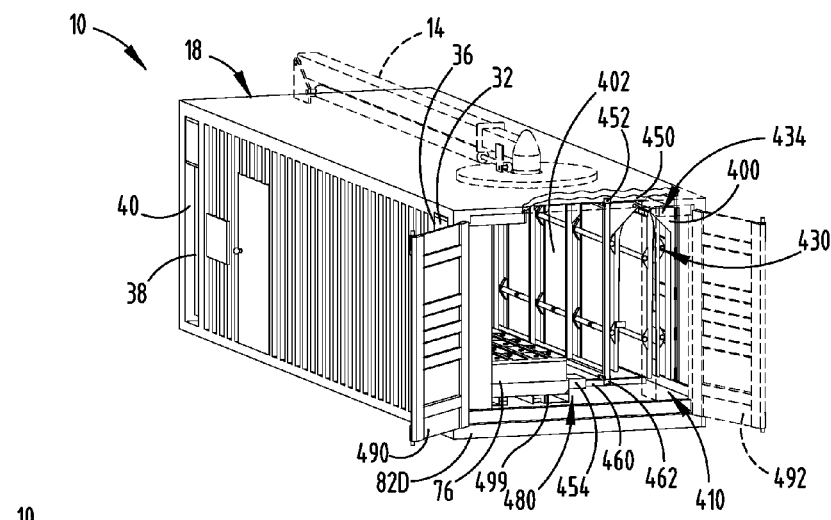
FIG. 16 depicts a perspective view of the electricity generator shown in FIG. 15 further illustrating the interior volume with the movable solar panel swing assembly stored therein.
Figure 16A:
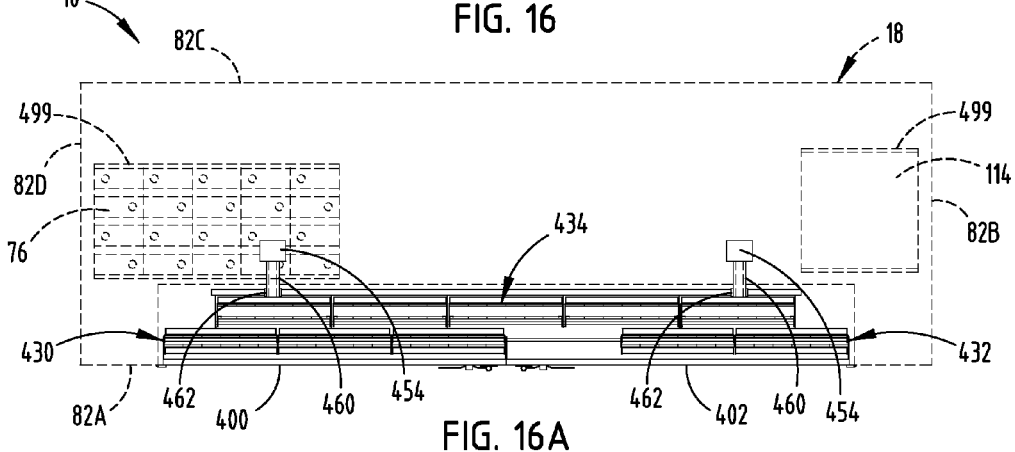
FIG. 16A depicts a top view of the movable solar panel swing assembly stored within the base.
Figure 17:
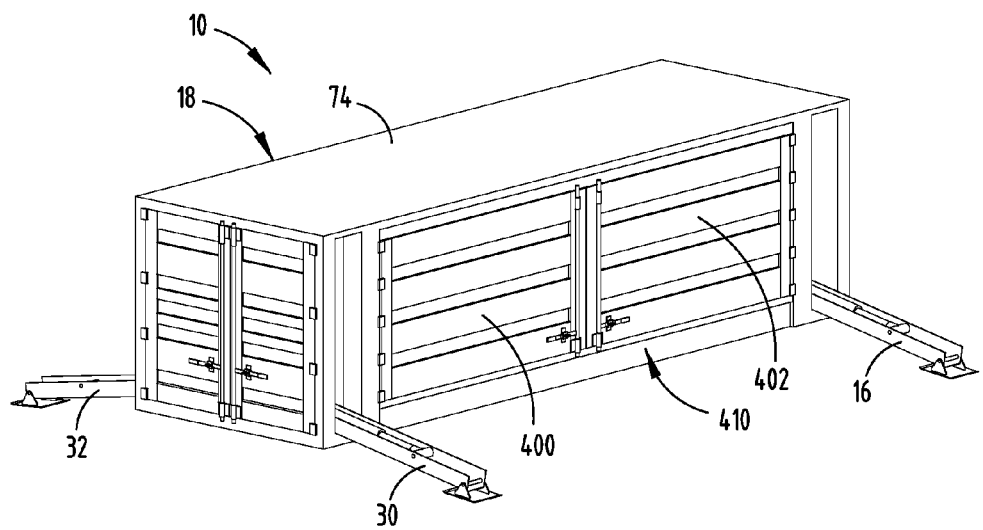
FIG. 17 depicts a perspective view of the electricity generator shown in FIG. 15 with the retractable legs of the base in a deployed position.

The electricity generator 10 is shown having first, second, third and fourth retractable support legs 16, 30, 32 and 38 which are shown at least partially housed in housings 28, 34, 36 and 40 in FIGS. 15 and 16. Referring to FIG. 17, the first, second, third and fourth retractable support legs 16, 30, 32 and 38 are shown in their respective extended positions to stabilize the base 18. It should be appreciated that the support legs may or may not be used and may include other support devices.

Each of the central solar panel swing 434 and the door mounted solar panel swings 430 and 432 includes an upper solar panel array 422 and a lower solar panel array 420 pivotally connected via pivoting axle 424. Each solar panel swing may include a frame for supporting the upper solar panel array 422 and the lower solar panel array 420. The frame supporting each of the upper and lower solar panel arrays 422 and 420 is pivotally connected to the pivoting axle 424 which is connected to a supporting structure such as the base or solar panel doors. Each of the solar panel arrays may include a protective cover placed over the back side. The frame may include supporting brackets that support a plurality of solar panels in a fixed arrangement, including one or more cross-members that provide structural support sufficient for use in an outdoor environment. The solar panel arrays 422 and 420 may be configured as shown and described above in connection with other embodiments.

Figure 18:
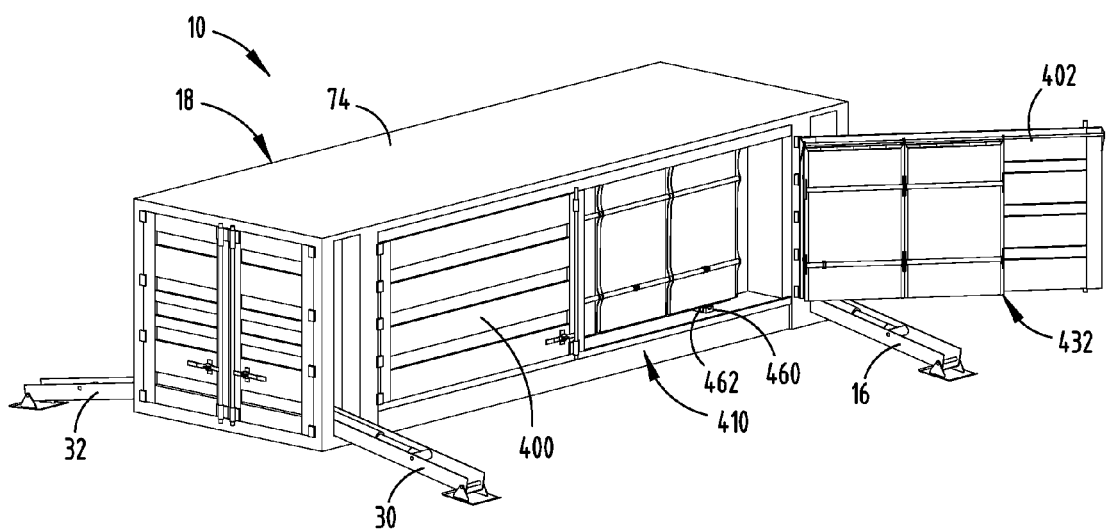
FIG. 18 depicts a perspective view of the electricity generator shown in FIG. 15 with a first solar panel door containing a solar panel swing rotated partially open.
Figure 19:
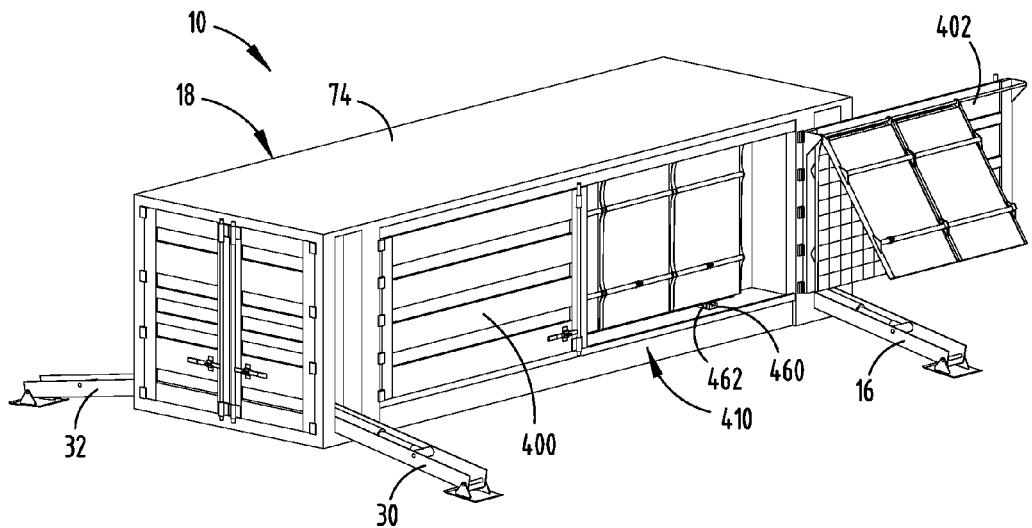
FIG. 19 depicts a perspective view of the electricity generator shown in FIG. 18 with the solar panel swing partially unfolded on the open first solar panel door.
Figure 20:
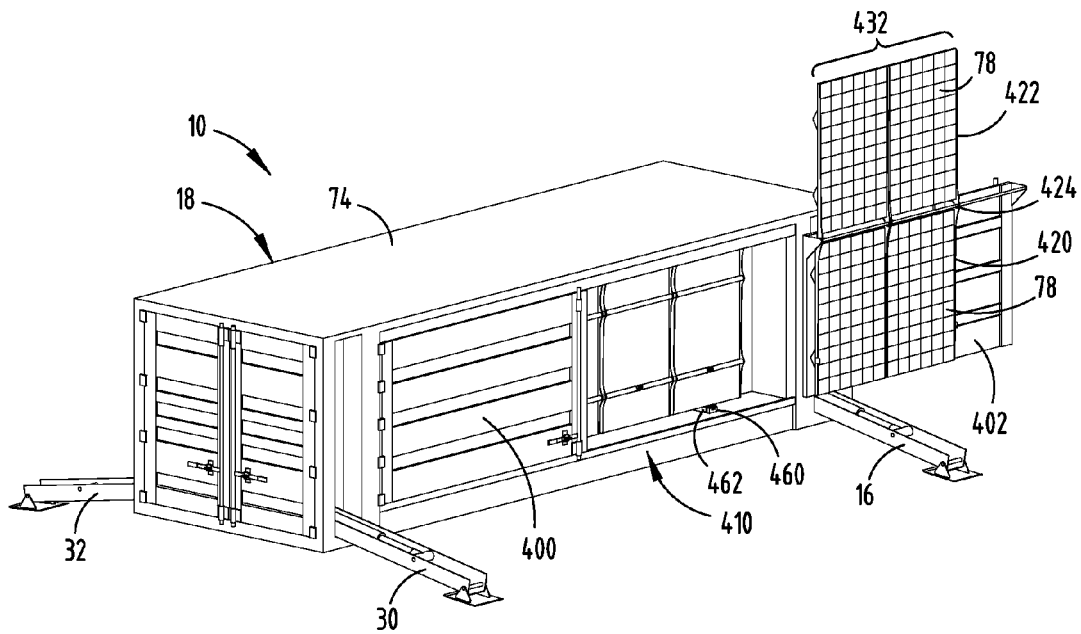
FIG. 20 depicts a perspective view of the electricity generator shown in FIG. 19 with the solar panel swing further unfolded.
Figure 21:
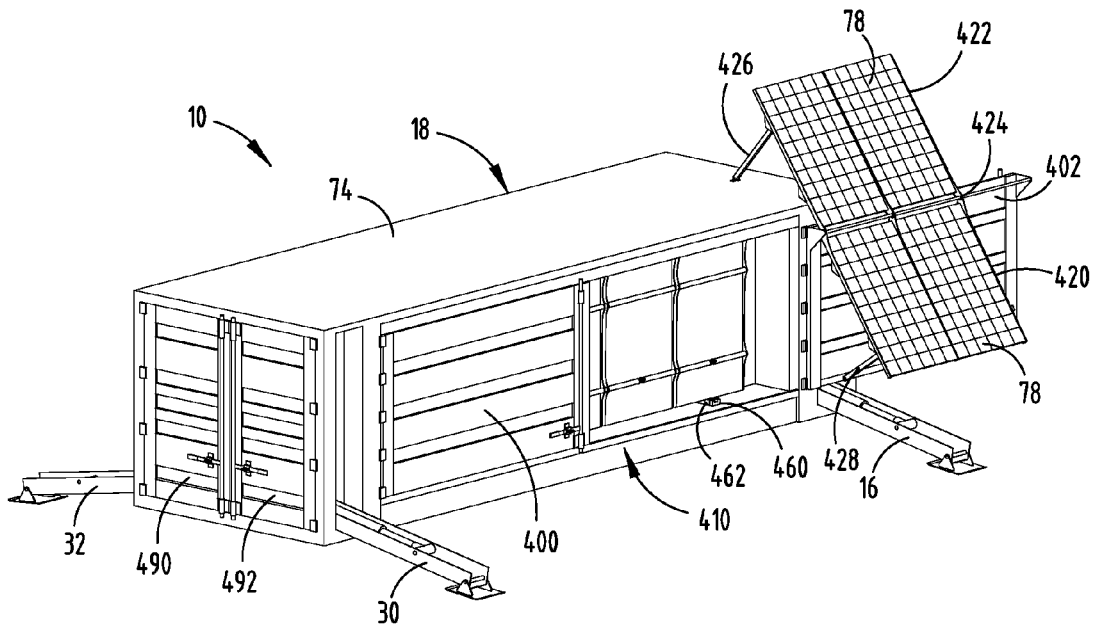
FIG. 21 depicts a perspective view of the electricity generator with the solar panel swing associated with the first solar panel door in the fully deployed position.

Deployment of the solar panels 78 of electricity generator 10 is illustrated in FIGS. 18-26. In FIG. 18 the first solar panel door 402 is shown swung to a partially open position to expose the first solar panel swing 432 assembled to the inside surface thereof and to partially expose the movable solar panel swing assembly 410 stored in the internal volume 480 of base 18. Once the first solar panel door 402 is in the fully open position as shown in FIG. 19, the top solar panel array 422 is rotated approximately one hundred eighty degrees (180°) relative to the bottom solar panel array 420 to the unfolded position, the first solar panel swing 432 is pivoted from the folded position upward as shown in FIGS. 19 and 20 by folding the upper solar panel array 422 relative to the lower solar panel array 420 approximately one hundred eighty degrees (180°). Each of the upper solar panel arrays 422 and lower solar panel arrays 420 has an array of solar panels 78 for converting solar energy into electrical energy. Once the upper solar panel array 422 and lower solar panel array 420 are fully unfolded, the solar panel swing 432 may be rotated about pivoting hinge 424 to a use position as shown in FIG. 21 that faces a solar energy source (e.g., the sun). To maintain the solar panel swing 432 in the use position, support rods 426 and 428 may be employed as top and bottom supports to maintain the solar panel swing 432 fixed in place on the base 18 in the use position. The top support rods 426 may be bolted or otherwise fastened onto the top wall 74 of base 18 and the bottom support rods 428 may be bolted or otherwise fastened to a lower frame of the door 402.

Figure 22:
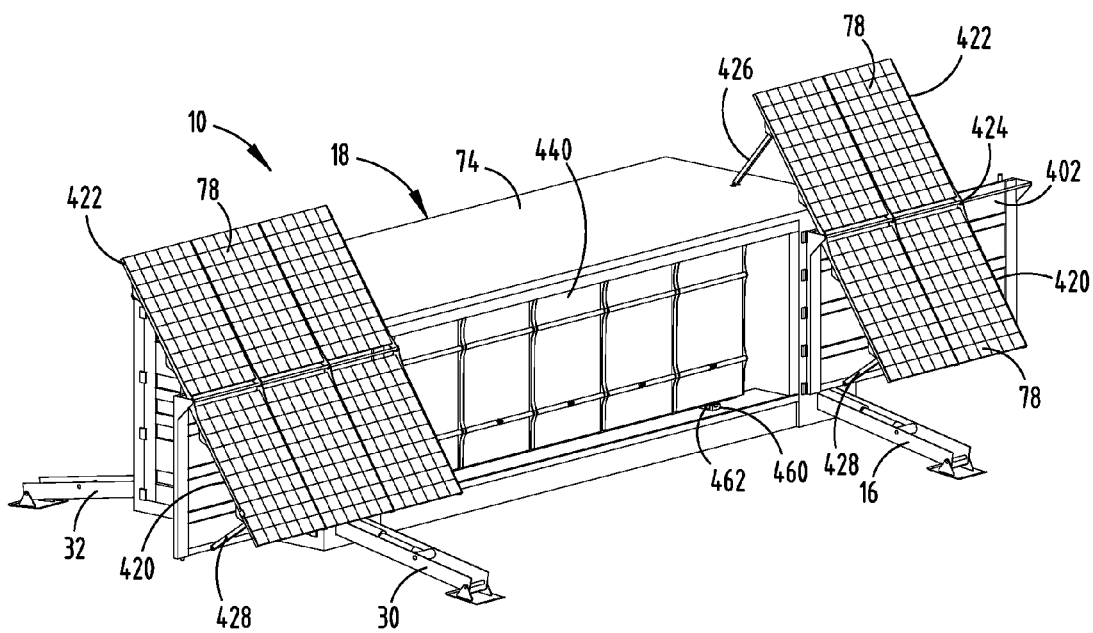
FIG. 22 depicts a perspective view of the electricity generator shown in FIG. 15 with solar panel swings associated with first and second solar panel doors each shown in the deployed position.

The second solar panel door 400 may likewise be opened by pivoting one hundred eighty degrees (180°) to an open position on the opposite side of base 18 and the solar panel array 430 unfolded and connected to the base via upper support bars 426 and lower support bars 428 in the same manner as the first solar panel door 402 as shown in FIG. 22. While the first solar panel door 402 is shown having four solar panel arrays 422 and 420 each having an array of solar panels 78, and the second solar panel door 400 is shown having six solar panel arrays 422 and 420, each having an array of solar panels, it should be appreciated that any number of solar panel arrays 422 and 420 may be employed on each of the solar panel doors 400 and 402. It should further be appreciated that while solar panels doors 400 and 402 are shown as swing doors, the doors may otherwise move such as by sliding and may be moved manually or with the use of an actuator.

Figure 23:
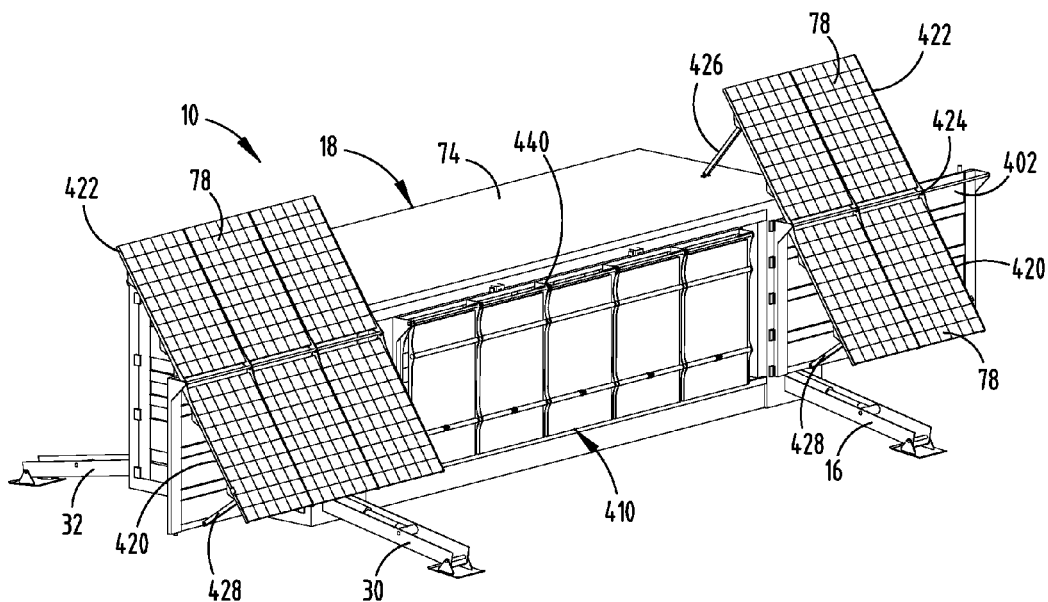
FIG. 23 depicts a perspective view of the electricity generator further illustrating outward movement of the movable solar panel swing assembly.

The movable solar panel swing assembly 410 is shown in FIG. 22 stored within the internal volume 480 of the base 18 and may be actuated outward to a position outside of the internal volume 480 by moving the support structure 402 and solar panel swing 434 coupled thereto to an outward exposed position as shown in FIG. 23. The support structure 402 may include a wall made of a material, such as metal, that is operatively supported by a track assembly on the base 18 and allowed to move between an internal stored position and an external exposed position. In one embodiment, upper track 450 and lower track 460 are provided inside of the base 18 and the support structure 402 is operatively coupled to a plurality of roller assemblies 452 and 462 that allow the support structure 402 and central solar panel swing 434 to roll via roller assemblies 452 and 462 on the upper and lower tracks 450 and 460 between the stowed and deployed positions. In one embodiment, the upper track 450 is provided on base 18 to engage upper roller assembly 452 provided on opposite ends of the support structure 402. In addition, the lower track 460 is provided in base 118 to engage roller assembly 462 provided near the lower end of support structure 402. It should further be appreciated that a drive mechanism 454 may be provided to actuate the support structure 402 and central solar panel swing 434 coupled thereto between the stowed position stored within the internal volume 480 and the outward exposed position. The drive mechanism 454 may include an electric motor or a hydraulic actuator. It should further be appreciated that a rack-and-pinion actuator or a screw-type auger actuator may be employed to actuate the movable solar panel swing assembly 410. Further, it should be appreciated that a manual actuation of the movable solar panel swing assembly 410 may be employed according to a further embodiment.

Figure 24:
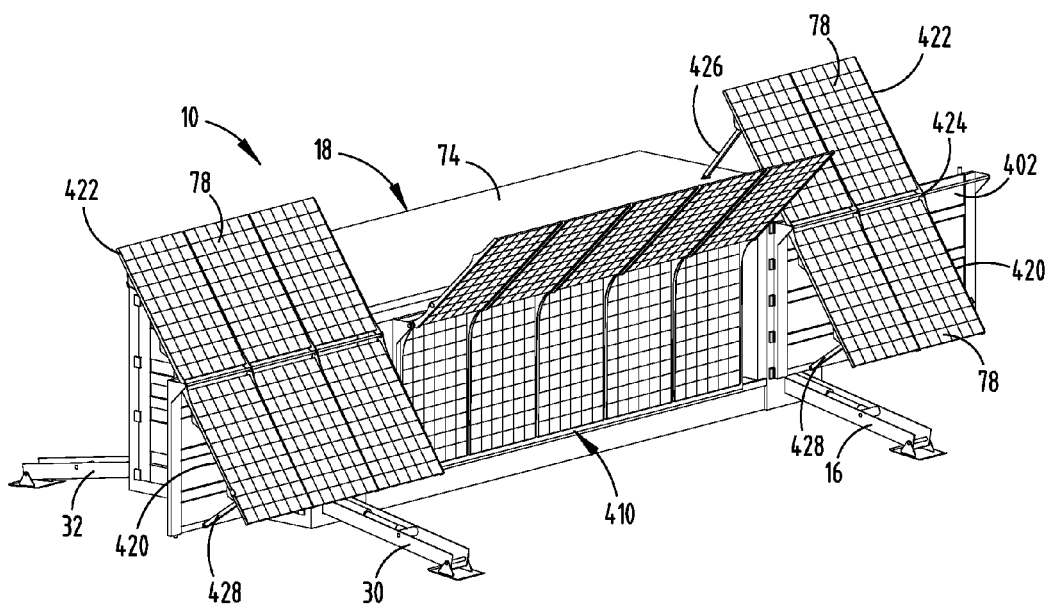
FIG. 24 depicts a perspective view of the electricity generator shown in FIG. 15 with the solar panel swing associated with the movable solar panel swing assembly shown in a partially deployed position.
Figure 25:
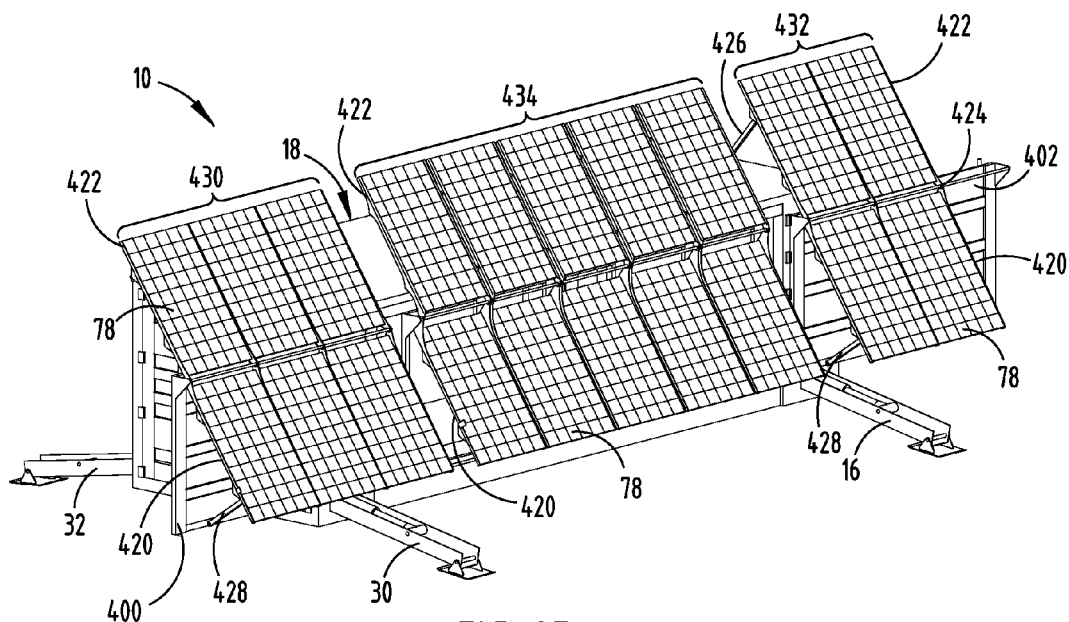
FIG. 25 depicts a perspective view of the electricity generator shown in FIG. 15 illustrating all of the solar panel swings deployed in the use position.
Figure 26:
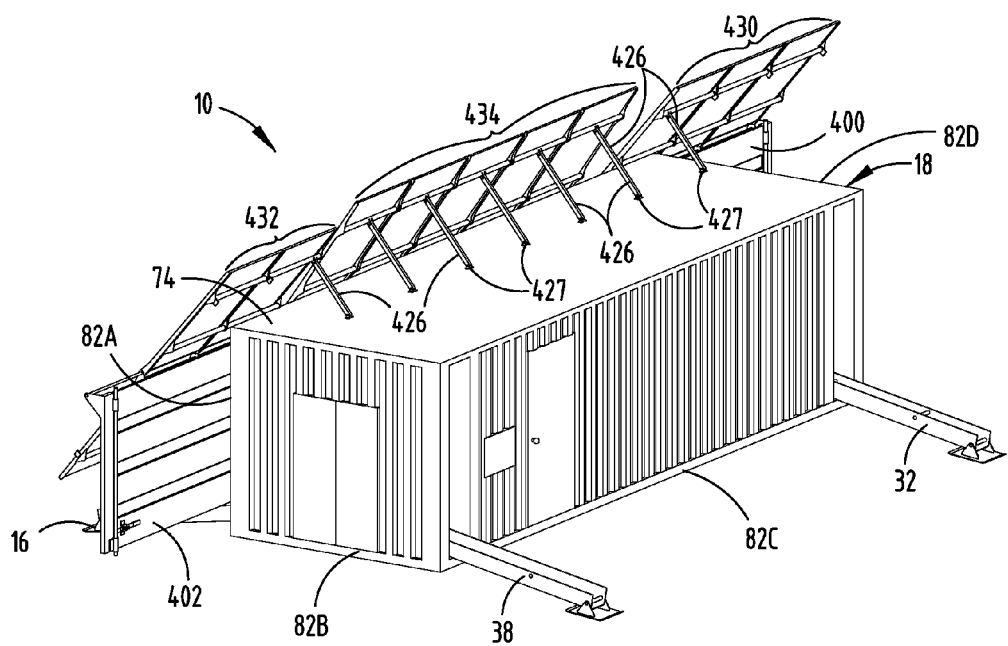
FIG. 26 depicts a rear perspective view of the electricity generator showing the solar panels fully deployed.

Once the movable solar panel swing assembly 410 has been moved outward to a use position as shown in FIG. 23, central solar panel swing 434 may be unfolded by rotating the upper panels 422 relative to the lower solar panel arrays 420 approximately one hundred eighty degrees (180°) as shown in FIGS. 24 and 25. Thereafter, each of the upper solar panel arrays 422 and lower panels 420 may be fixedly connected to the base 18 by connecting upper and lower support rods 426 and 428. The upper support rods 426 may be fastened or otherwise connected to the top side 74 of base 18 and the lower bars 428 may be fastened or otherwise connected to the front wall 82A of base 18. It should be appreciated that the support structure 402 provides a closure to side wall 82A when the solar panel swing assembly 410 is in the outward exposed position.

In the embodiment shown, ten solar panel arrays 422 and 420 are shown provided on the central solar panel swing 434. However, it should be appreciated that any number of solar panel arrays 420 and 422 each having a plurality of solar panels may be employed. It should further be appreciated that while a single unitary movable solar panel swing assembly 410 shown and described herein, that the movable solar panel swing assembly 410 may be made up of two or more support structures and two or more solar panels swings that move independently between the stowed position within the internal volume of base 18 and the outward exposed position.

In the foregoing description, it will be readily appreciated by those skilled in the art that modifications may be made to the invention without departing from the concepts as disclosed herein. Such modifications are to be considered as included in the following claims, unless those claims by their language expressly state otherwise.

What is claimed is:

1. An electricity generator comprising:
a base comprising side walls defining an interior volume, wherein at least one of the side walls comprises one or more doors for allowing access to the interior volume; and
a movable solar panel swing assembly comprising a support structure connected to a first solar panel swing and disposed on a track for allowing movement of the assembly between a stowed position within the interior volume and a use position outside the interior volume, wherein the solar panel swing comprises one or more solar panels that rotate between a folded position and a use position.

2. The electricity generator of claim 1, wherein the at least one door comprises a second solar panel swing comprising one or more solar panels that are rotated between a folded position and a use position when the at least one door is in the open position.

3. The electricity generator of claim 2, wherein the one or more doors comprises a first door and a second door, wherein the first and second doors open in the opposite directions, each of the first and second doors comprising a solar panel swing comprising one or more solar panels that rotate between a folded position and a use position.

4. The electricity generator of claim 1, wherein the track comprises a plurality of rollers for rolling the support structure between the stowed position within the internal volume of the base and the use position outside of the internal volume of the base.

5. The electricity generator of claim 1 further comprising an energy storage device operatively coupled to the one or more solar panels, wherein the energy storage device is capable of at least temporarily storing energy from the electricity.

6. The electricity generator of claim 5, wherein the energy storage device comprises a battery capable of at least partially storing the electricity.

7. The electricity generator of claim 1, wherein the generator is mobile.

8. The electricity generator of claim 1, wherein the solar panel swing comprises a first solar panel and a second solar panel, wherein the first solar panel rotates relative to the second solar panel between a use position and a folded position.

9. The electricity generator of claim 8, wherein the solar panel swing in the folded position lies approximately flush against an inside surface of the one or more doors.

10. The electricity generator of claim 1 further comprising:
a boom comprising a first end and a second end; and
a wind turbine attached to the second end of the boom, wherein the wind turbine is capable of transforming wind into electricity.

11. The electricity generator of claim 10 further comprising a fuel-based generator capable of transforming fuel into electricity.

12. The electricity generator of claim 1 further comprising a first retractable support leg, a second retractable support leg, and a third retractable support leg, wherein the first retractable support leg is capable of both a retracted position and an extended position, wherein the second retractable support leg is capable of both a retracted position and an extended position, and wherein the third retractable support leg is capable of both a retracted position and an extended position.

13. The electricity generator of claim 12, wherein the base comprises:
- a first housing that at least partially houses the first retractable support leg when the first retractable support leg is in a retracted position;
- a second housing that at least partially houses the second retractable support leg when the second retractable support leg is in the retracted position; and
- a third housing that at least partially houses the third retractable support leg when the third retractable support leg is in the retracted position.

14. An electricity generator comprising:
- a base comprising side walls defining an interior volume, wherein at least one of the side walls comprises first and second doors for allowing access to the interior volume; and
- a movable solar panel swing assembly comprising a support structure connected to a first solar panel swing and disposed on a track for allowing movement of the assembly between a stowed position within the interior volume and a use position outside the interior volume, a second solar panel swing connected to the first door and comprising one or more solar panels that rotate between a folded position and a use position when the first door is in the open position, and a third solar panel swing connected to the second door and comprising one or more solar panels that rotate between a folded position and a use position when the second door is in the open position.

15. The electricity generator of claim 14, wherein the track comprises a plurality of rollers for rolling the support structure between the stowed position within the internal volume of the base and the use position outside of the internal volume of the base.

16. The electricity generator of claim 14, wherein the movable solar panel swing comprises a plurality of movable solar panel swing assemblies each comprising a support structure connected to a solar panel swing and disposed on a track for allowing movement of the plurality of assemblies between a stowed position within an interior volume and a use position outside the interior volume.

17. The electricity generator of claim 14 further comprising an energy storage device operatively coupled to the one or more solar panels, wherein the energy storage device is capable of at least temporarily storing energy from the electricity.

18. The electricity generator of claim 17, wherein the energy storage device comprises a battery capable of at least partially storing the electricity.

19. The electricity generator of claim 14, wherein the generator is mobile.

20. The electricity generator of claim 14, wherein the solar panel swing comprises a first solar panel and a second solar panel, wherein the first solar panel rotates relative to the second solar panel between a use position and a folded position, and wherein the solar panel swing in the folded position lies approximately flush against an inside surface of the one or more doors.

* * * * *